United States Patent
Hayashi

(10) Patent No.: US 10,432,255 B2
(45) Date of Patent: Oct. 1, 2019

(54) TRANSMISSION DEVICE, TRANSMISSION METHOD, AND COMMUNICATION SYSTEM

(71) Applicant: Sony Corporation, Tokyo (JP)

(72) Inventor: Hiroaki Hayashi, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 16/064,823

(22) PCT Filed: Jan. 12, 2017

(86) PCT No.: PCT/JP2017/000807
§ 371 (c)(1),
(2) Date: Jun. 21, 2018

(87) PCT Pub. No.: WO2017/135001
PCT Pub. Date: Aug. 10, 2017

(65) Prior Publication Data
US 2019/0007095 A1 Jan. 3, 2019

(30) Foreign Application Priority Data

Feb. 2, 2016 (JP) ................... 2016-017962

(51) Int. Cl.
H04B 3/06 (2006.01)
H04B 3/04 (2006.01)
H04L 25/02 (2006.01)
H04L 25/03 (2006.01)
H04L 25/49 (2006.01)

(52) U.S. Cl.
CPC .............. H04B 3/06 (2013.01); H04B 3/04 (2013.01); H04L 25/02 (2013.01); H04L 25/026 (2013.01); H04L 25/028 (2013.01); H04L 25/0292 (2013.01); H04L 25/03 (2013.01); H04L 25/49 (2013.01)

(58) Field of Classification Search
CPC . H04B 3/06; H04B 10/40; H04B 1/00; H04B 10/50; H04B 10/11; H04B 10/60; H04B 1/38
USPC ............................................. 307/104
See application file for complete search history.

(56) References Cited

U.S. PATENT DOCUMENTS 8,064,535 B2  11/2011  Wiley
2016/0204964 A1*  7/2016  Takahashi ............ H04L 25/028
                                                        375/230

FOREIGN PATENT DOCUMENTS

| JP | 06-261092 A | 9/1994 |
| JP | 2011-517159 A | 5/2011 |
| JP | 2011-142382 A | 7/2011 |
| WO | 2015/021257 A1 | 2/2015 |

(Continued)

OTHER PUBLICATIONS

Extended European Search Report dated Dec. 14, 2018 for corresponding European Application No. 17747164.6.

Primary Examiner — John W Poos
(74) Attorney, Agent, or Firm — Michael Best & Friedrich LLP

(57) ABSTRACT

A transmission device of the present disclosure includes: a driver unit that transmits a data signal with use of a first voltage state, a second voltage state, and a third voltage state interposed between the first voltage state and the second voltage state, and is configured to make a voltage in the third voltage state changeable; and a controller that changes the voltage in the third voltage state to cause the driver unit to perform emphasis.

16 Claims, 32 Drawing Sheets

(56) References Cited

FOREIGN PATENT DOCUMENTS

WO 2015/146511 A1 10/2015
WO WO-2015182047 A1 * 12/2015 ........... H04L 25/028

* cited by examiner

[FIG. 1]
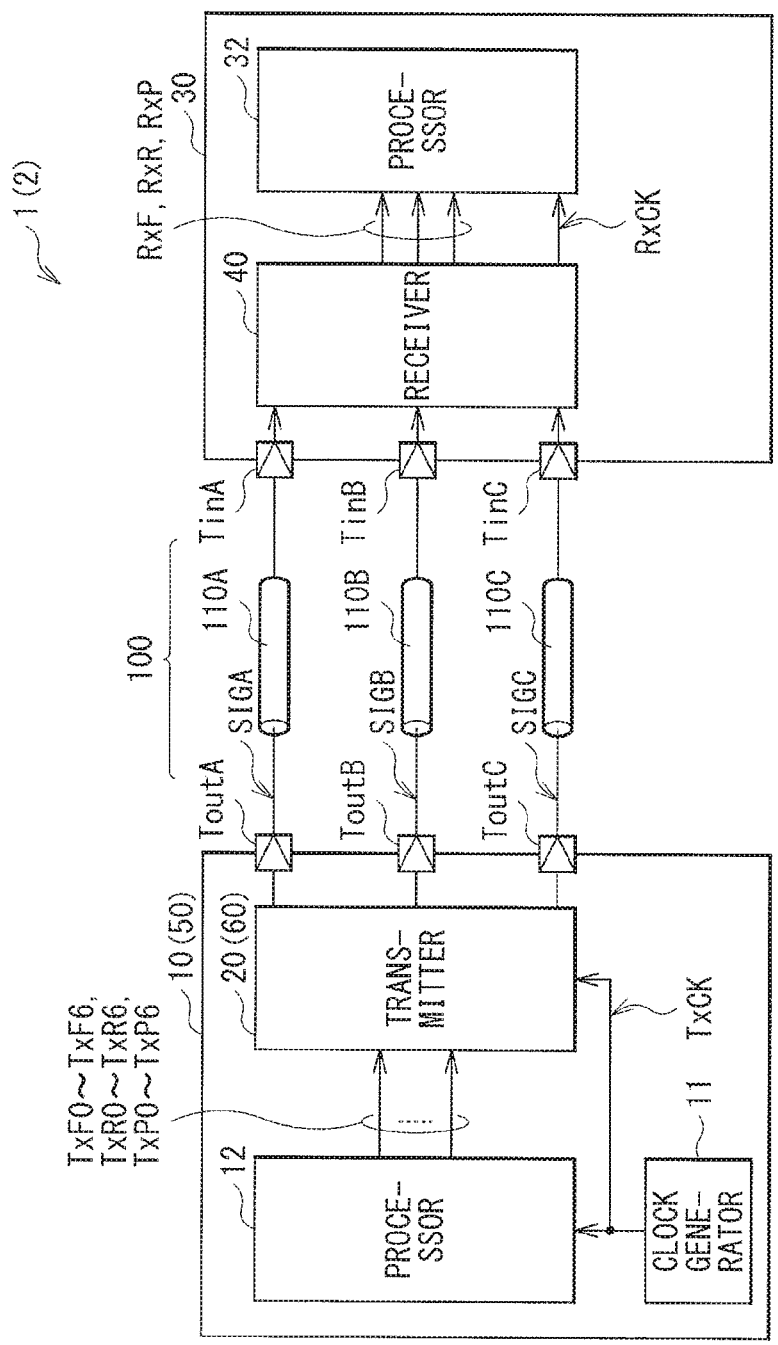

[ FIG. 2 ]
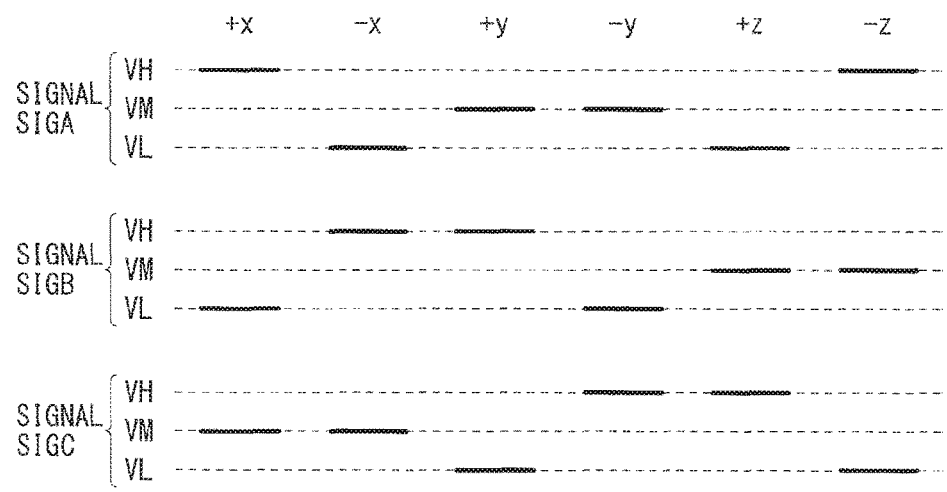
[ FIG. 3 ]
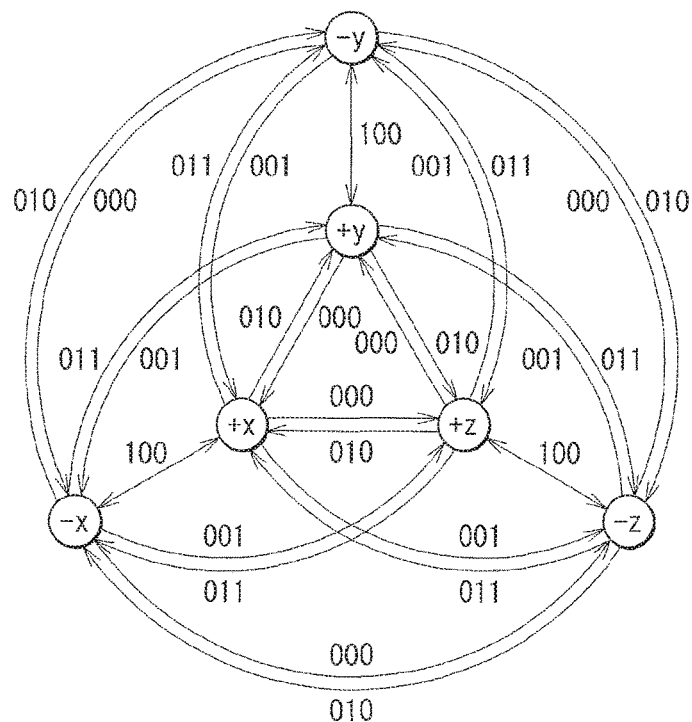

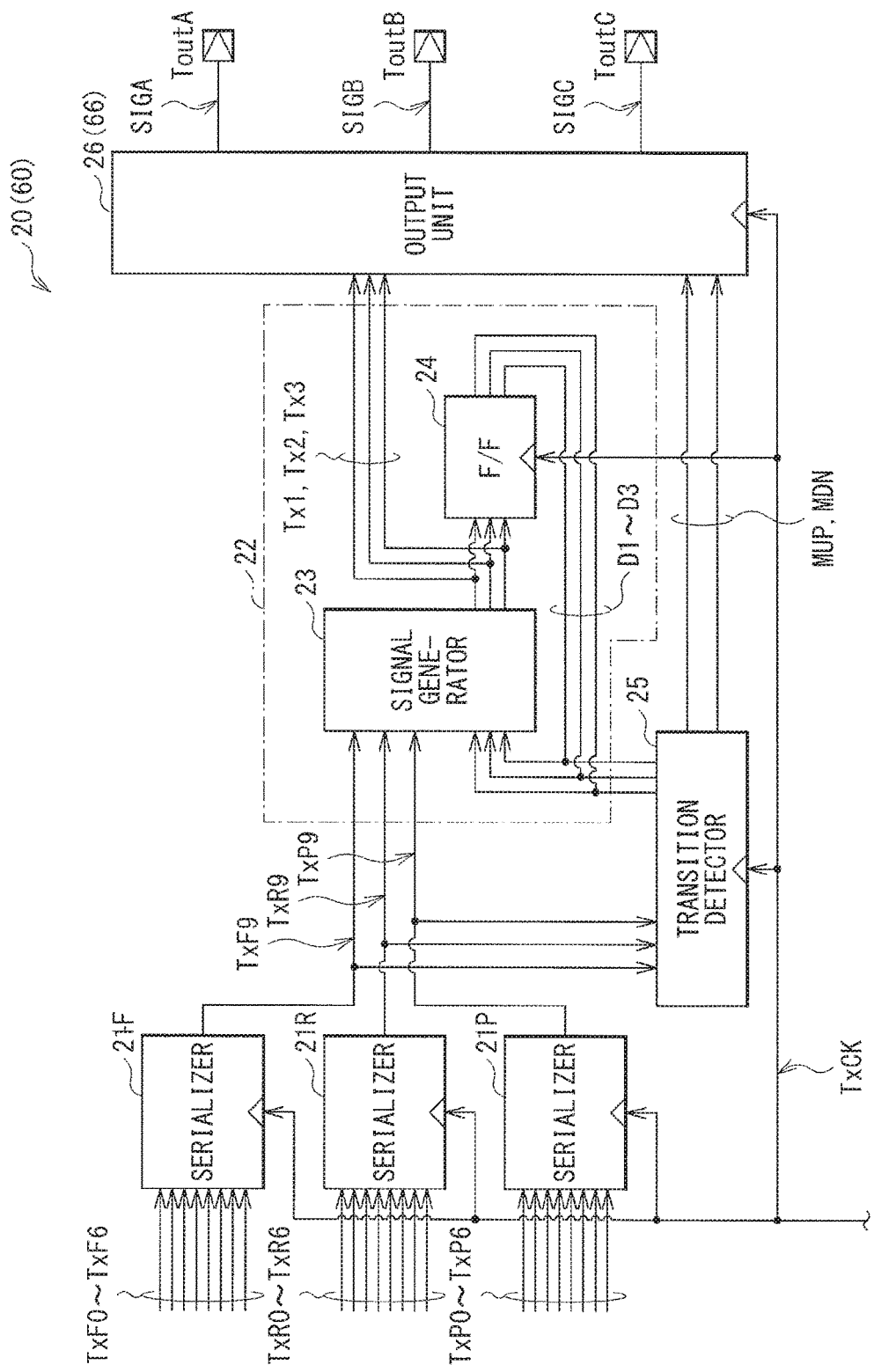
[FIG. 4]

[ FIG. 5 ]

| TxF9, TxR9, TxP9 | DS=+x | DS=-x | DS=+y | DS=-y | DS=+z | DS=-z |
|---|---|---|---|---|---|---|
| 000 | +z | -z | +x | -x | +y | -y | — WDN
| 001 | -z | +z | -x | +x | -y | +y |
| 010 | +y | -y | +z | -z | +x | -x | — WUP
| 011 | -y | +y | -z | +z | -x | +x |
| 1xx | -x | +x | -y | +y | -z | +z |

[ FIG. 6 ]

| SYMBOL | SYMBOL SIGNAL Tx1 | SYMBOL SIGNAL Tx2 | SYMBOL SIGNAL Tx3 | SIGNAL PUA | SIGNAL PDA | SIGNAL PUB | SIGNAL PDB | SIGNAL PUC | SIGNAL PDC | SIGNAL SIGA | SIGNAL SIGB | SIGNAL SIGC |
|---|---|---|---|---|---|---|---|---|---|---|---|---|
| +x | 1 | 0 | 0 | 1 | 0 | 0 | 1 | 1 | 1 | SH | SL | SM |
| -x | 0 | 1 | 1 | 0 | 1 | 1 | 0 | 1 | 1 | SL | SH | SM |
| +y | 0 | 1 | 0 | 1 | 1 | 1 | 0 | 0 | 1 | SM | SH | SL |
| -y | 1 | 0 | 1 | 1 | 1 | 0 | 1 | 1 | 0 | SM | SL | SH |
| +z | 0 | 0 | 1 | 0 | 1 | 1 | 1 | 1 | 0 | SL | SM | SH |
| -z | 1 | 1 | 0 | 1 | 0 | 1 | 1 | 0 | 1 | SH | SM | SL |

[FIG. 7]
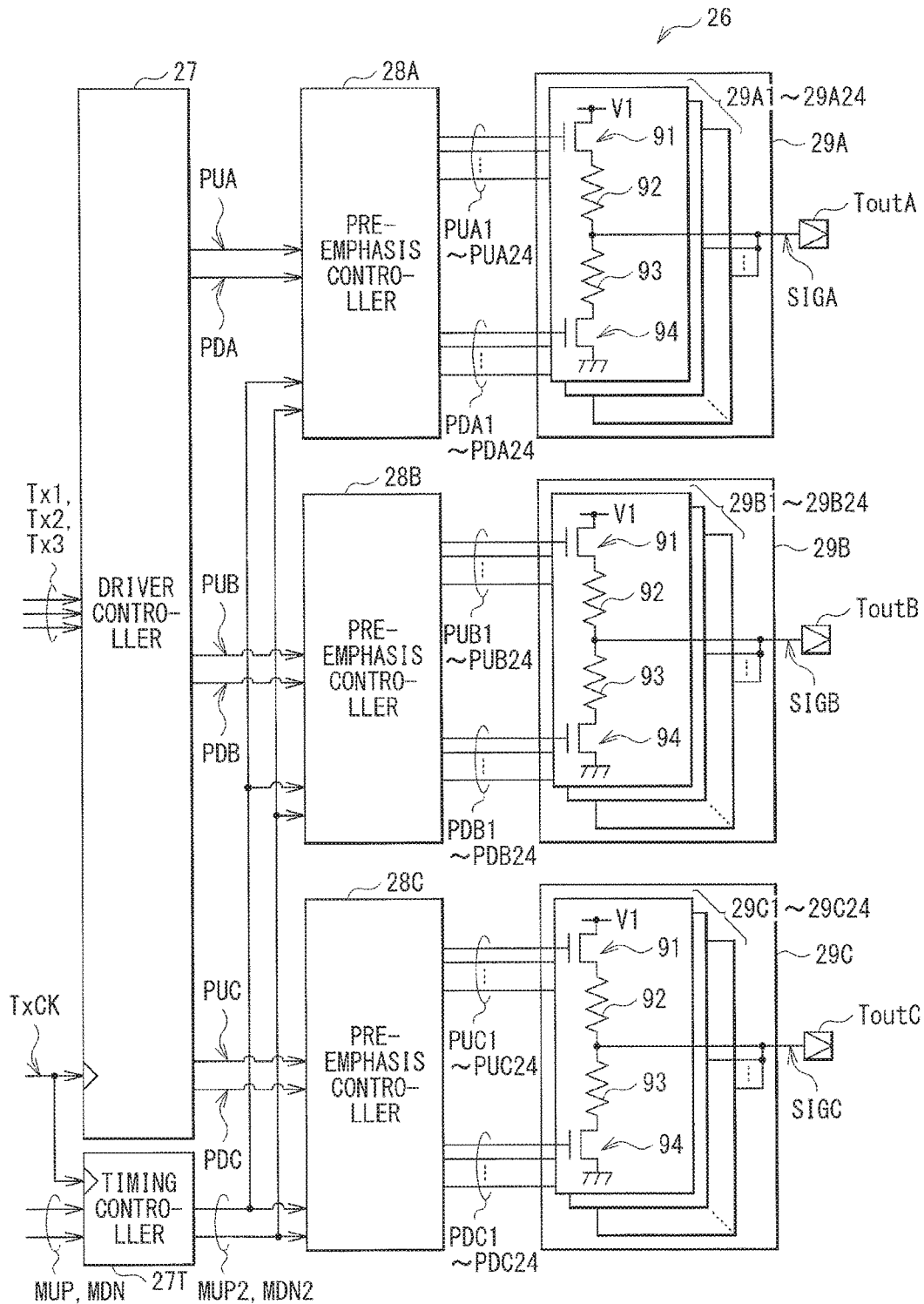

[FIG. 8]
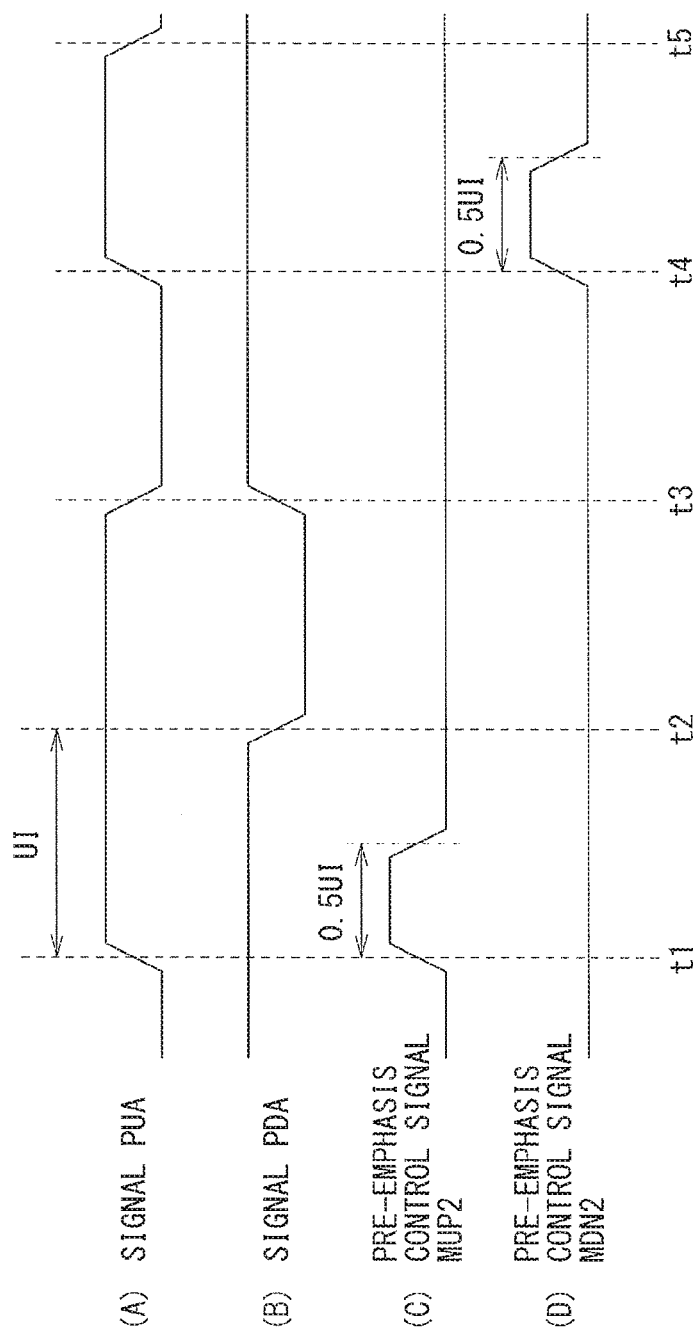

[ FIG. 9 ]
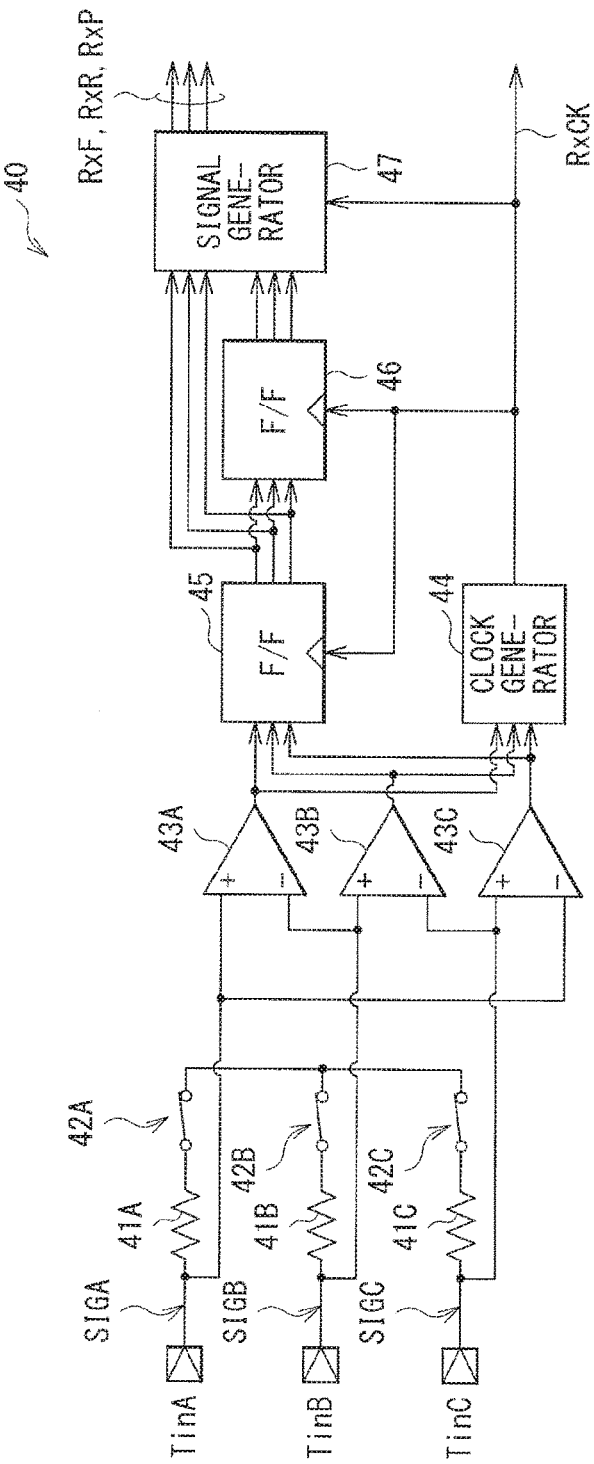

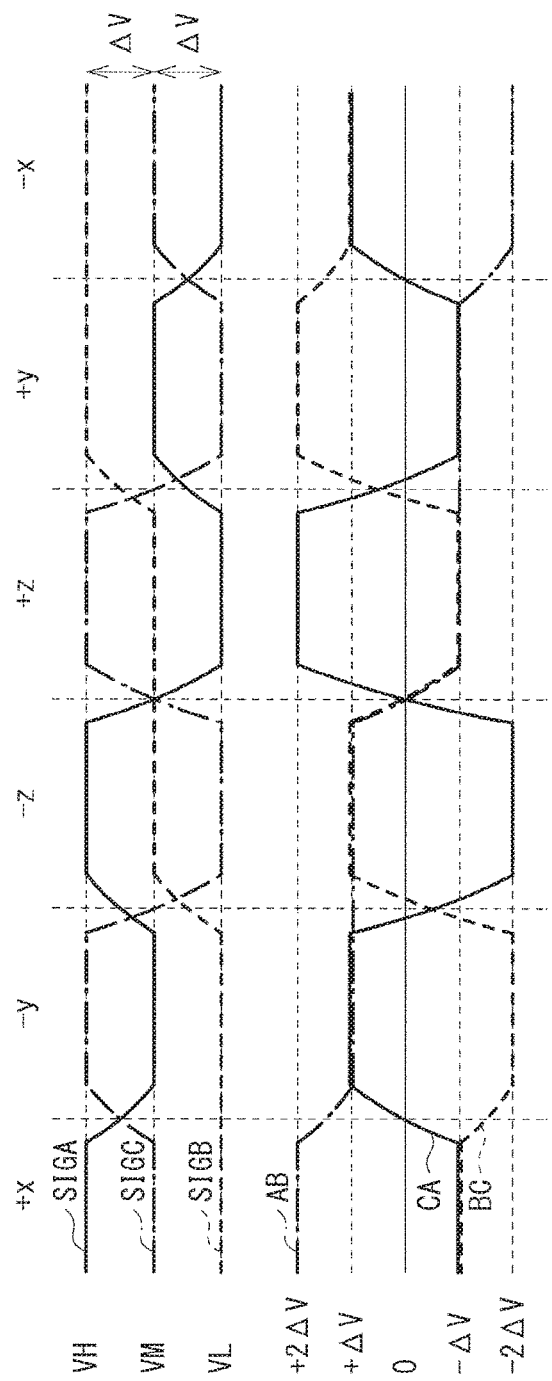
[ FIG. 10 ]

[ FIG. 11 ]
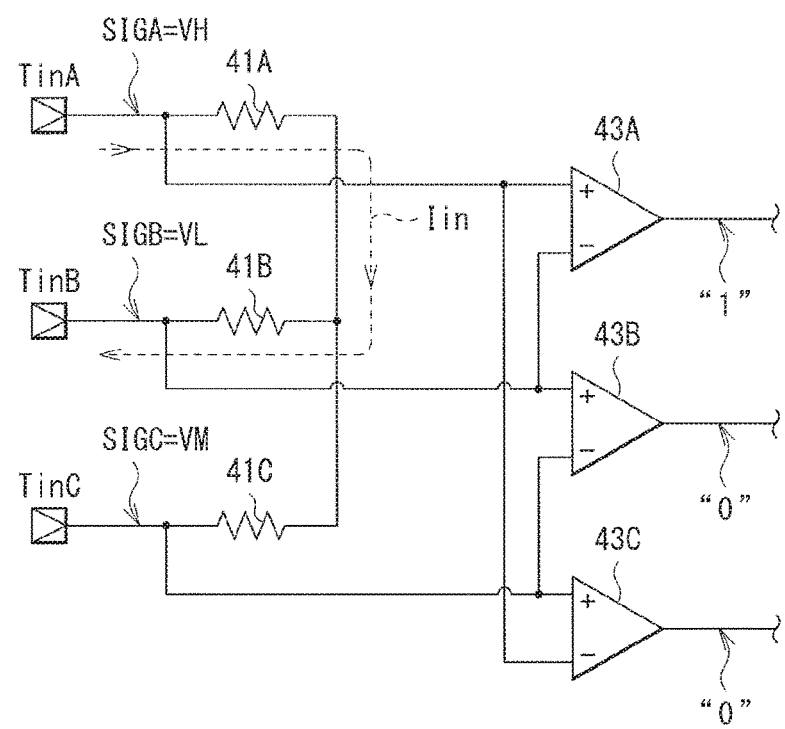
[ FIG. 12 ]
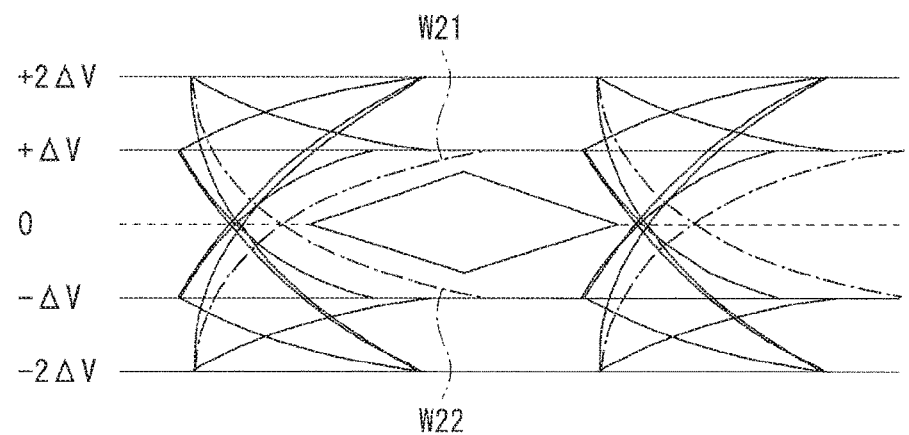

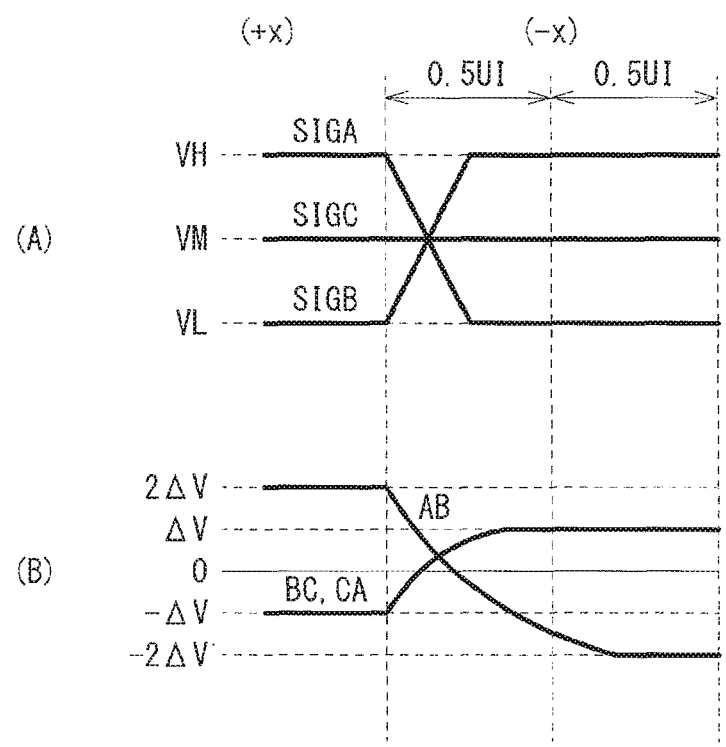
[FIG. 13A]

[ FIG. 13B ]
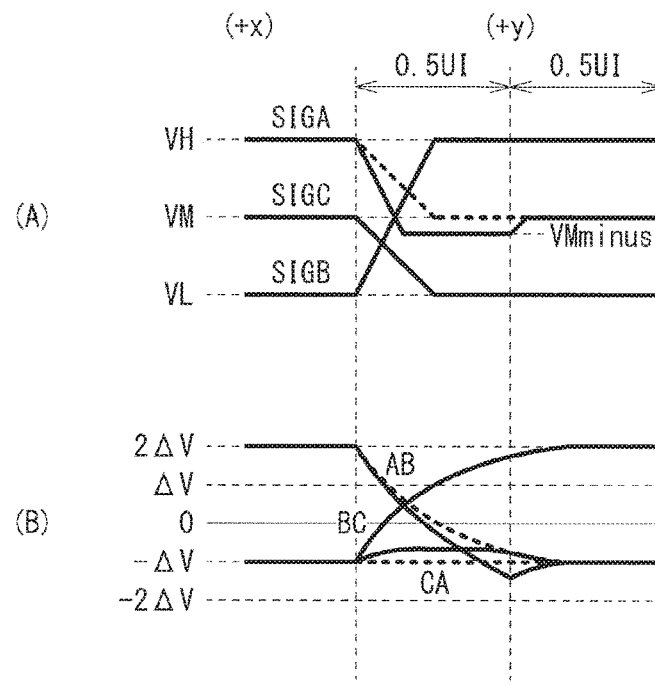
[ FIG. 13C ]
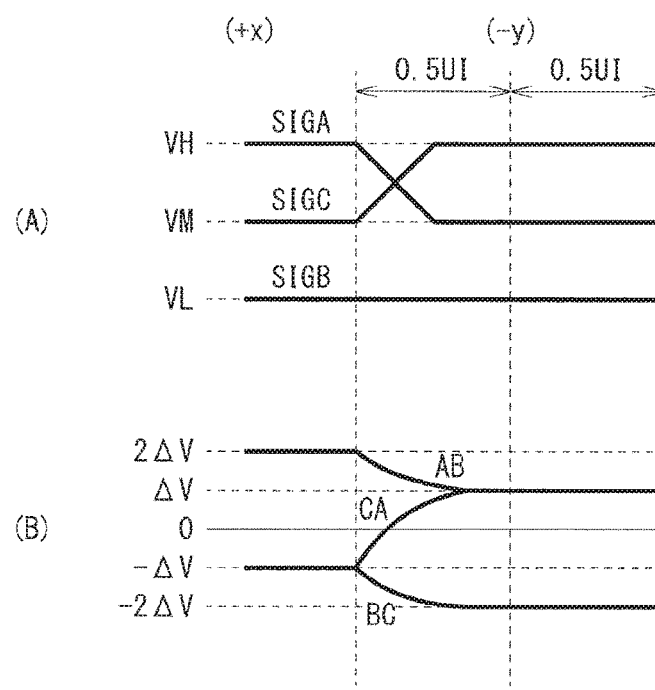

[ FIG. 13D ]
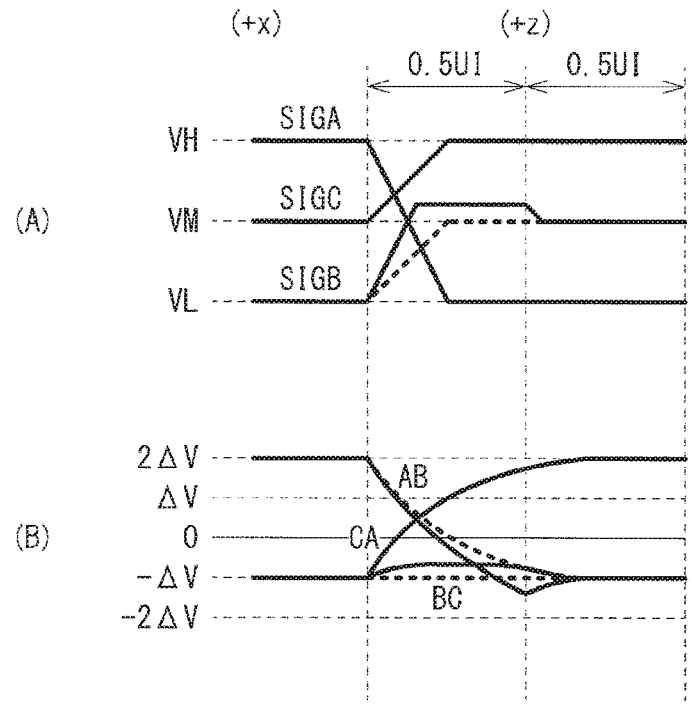
[ FIG. 13E ]
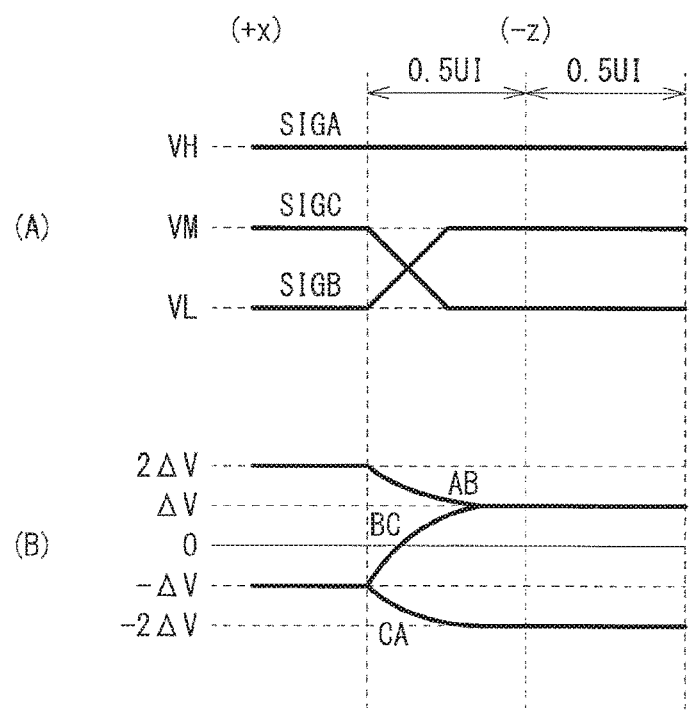

[ FIG. 14A ]
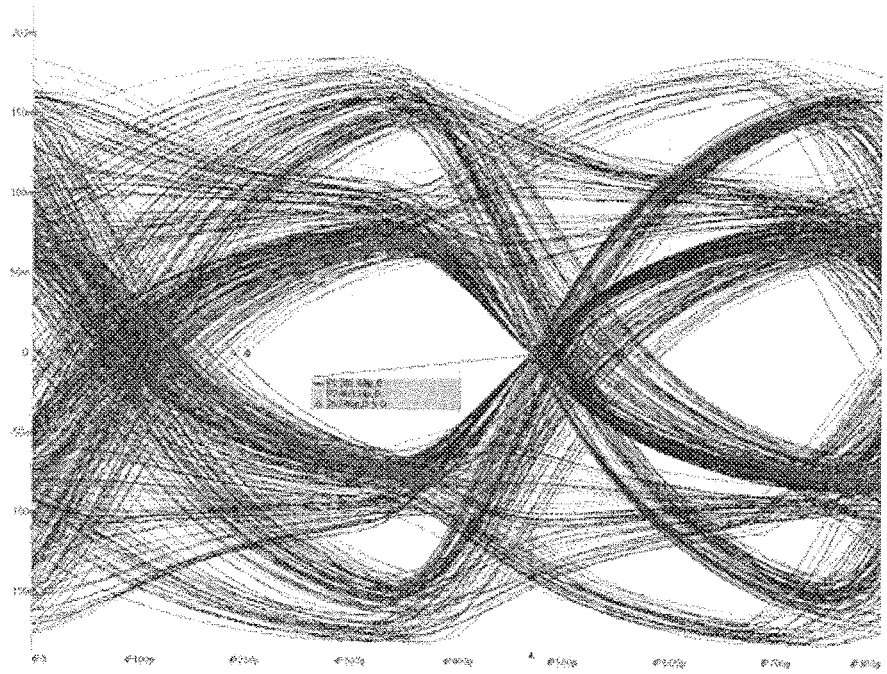
[ FIG. 14B ]
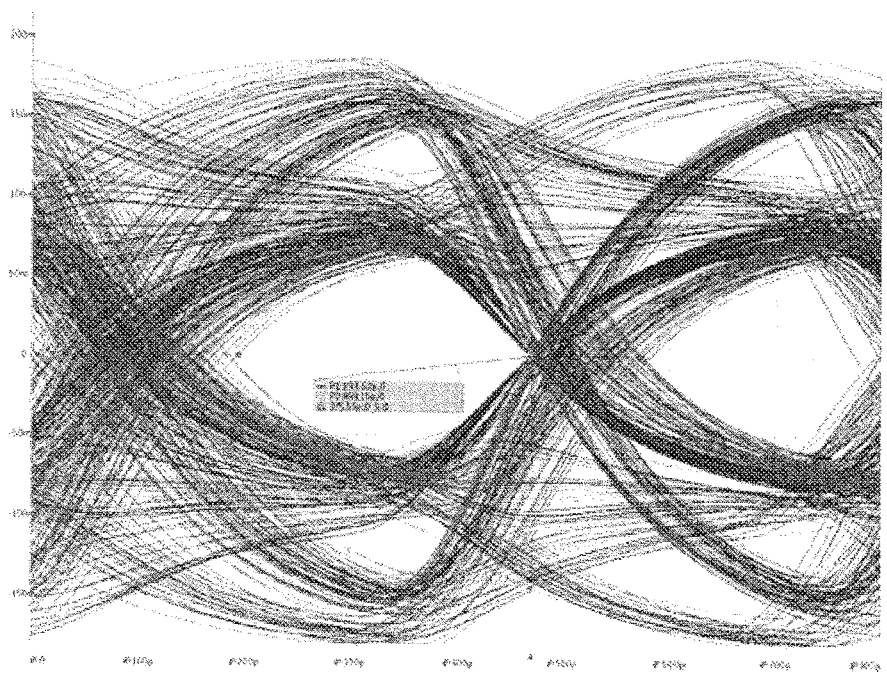

[ FIG. 14C ]
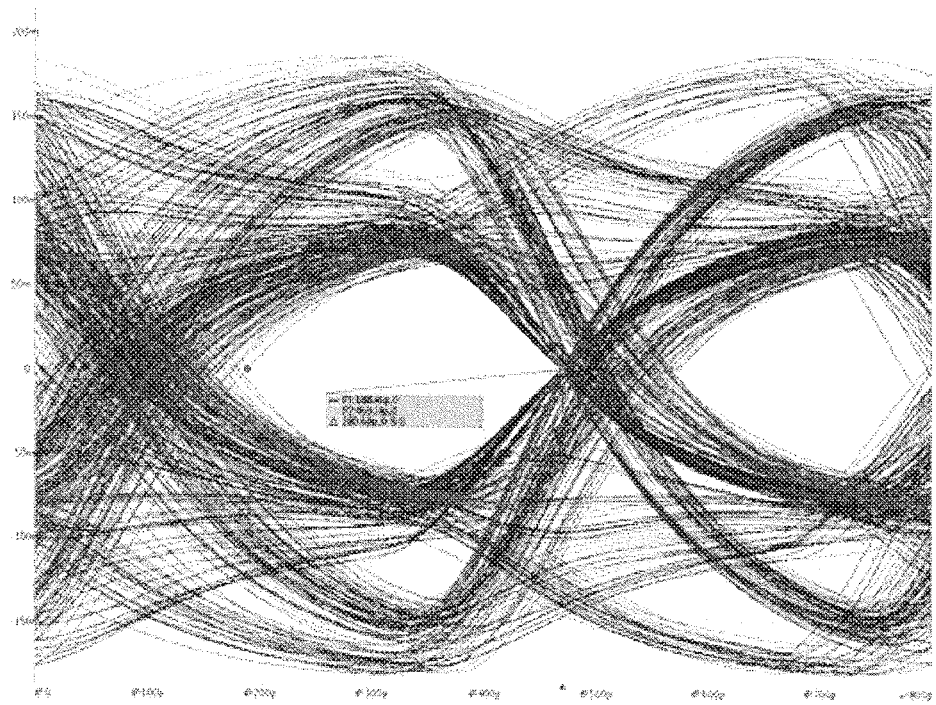
[ FIG. 14D ]
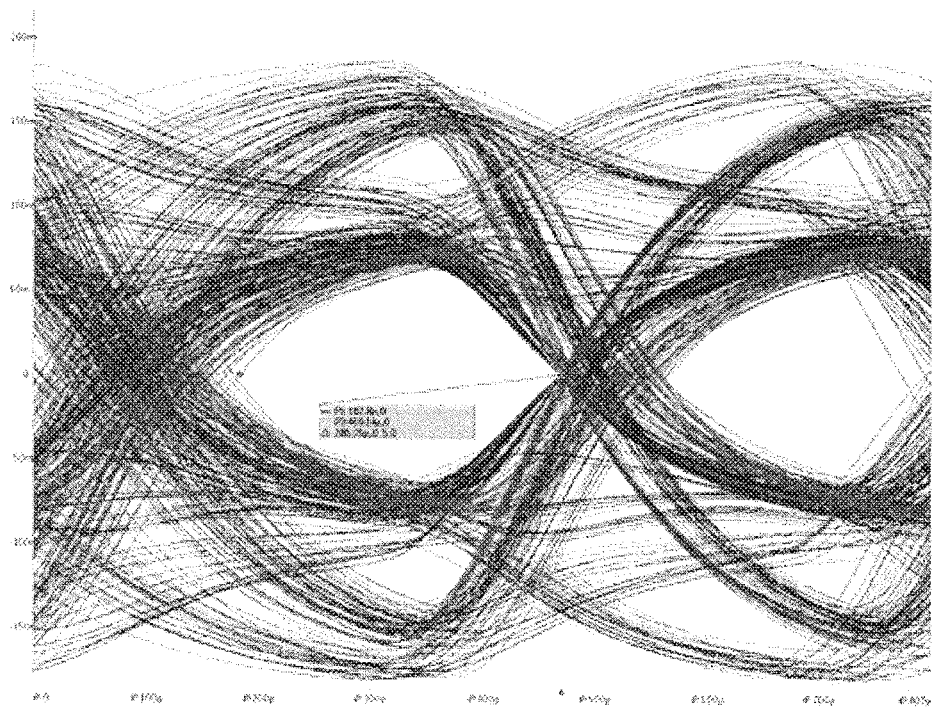

[ FIG. 15A ]
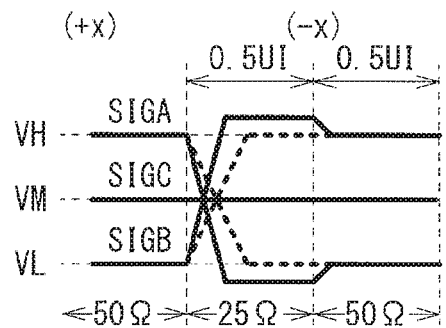
[ FIG. 15B ]
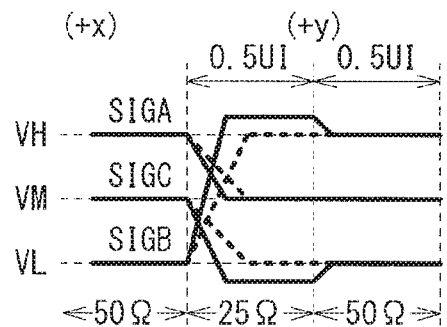
[ FIG. 15C ]
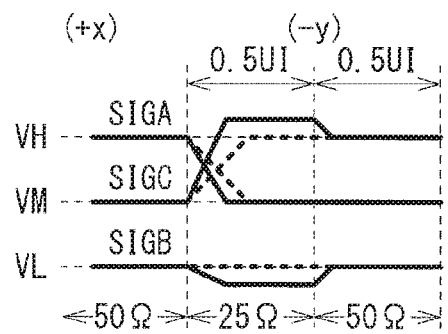

[ FIG. 15D ]
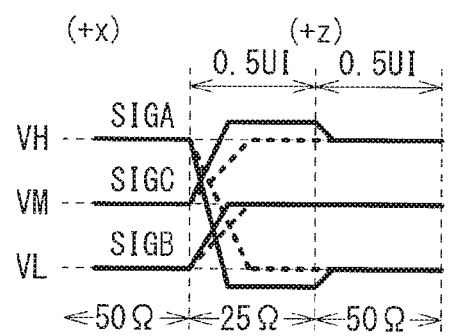
[ FIG. 15E ]
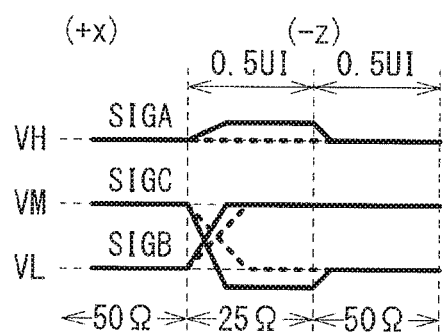

[FIG. 16]
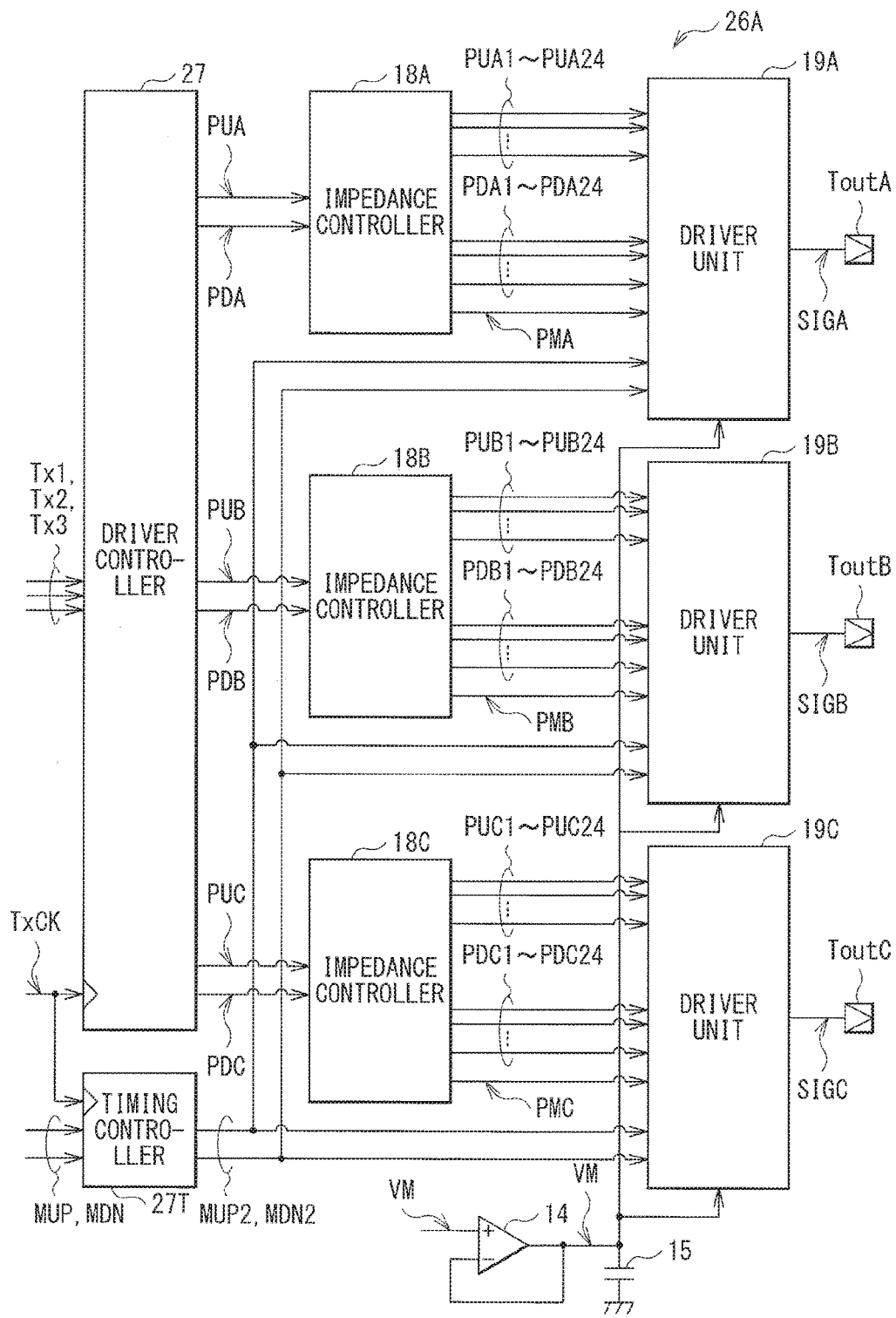

[FIG. 17]
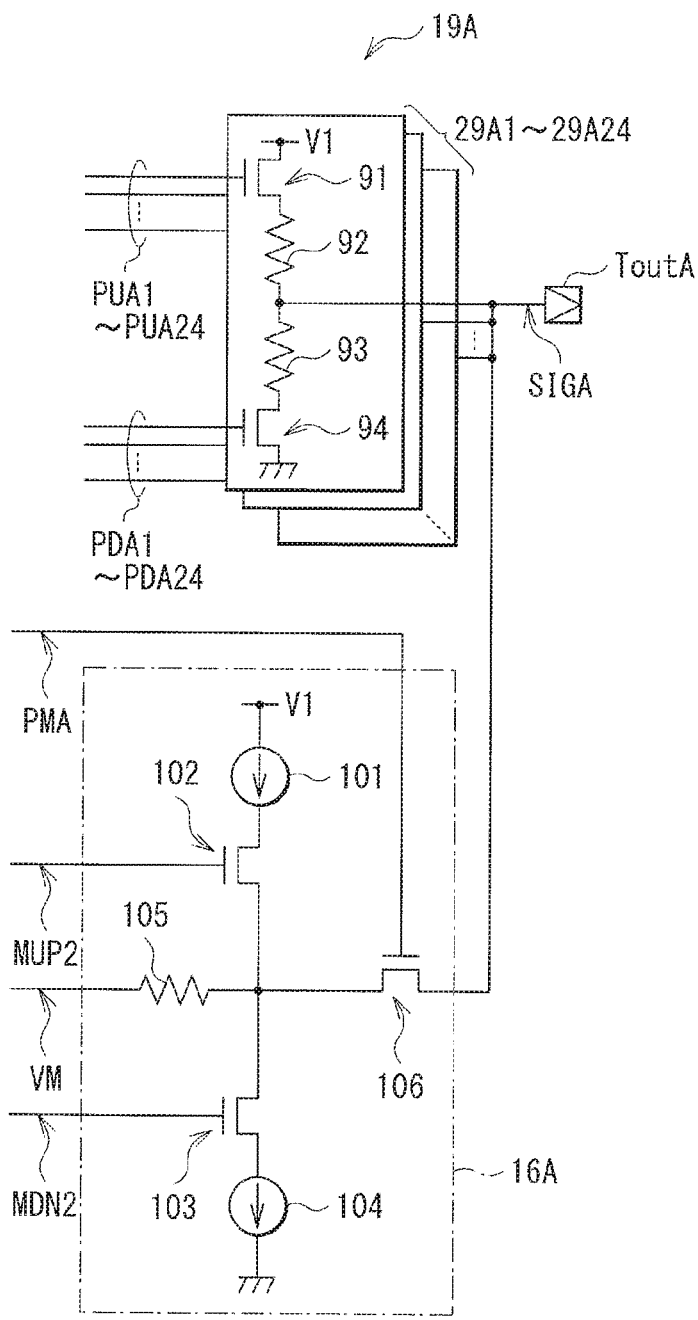

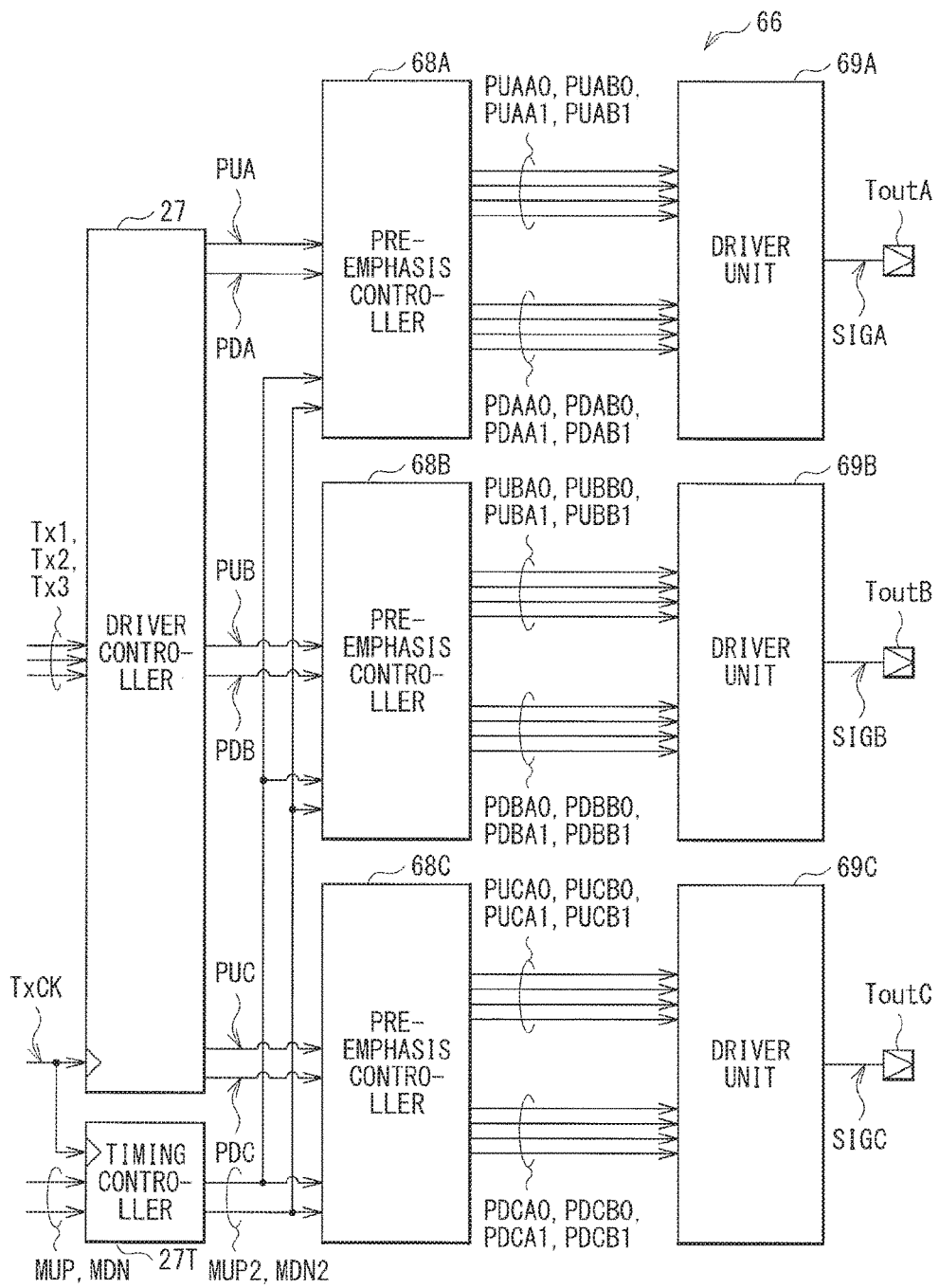
[FIG. 18]

[FIG. 19]
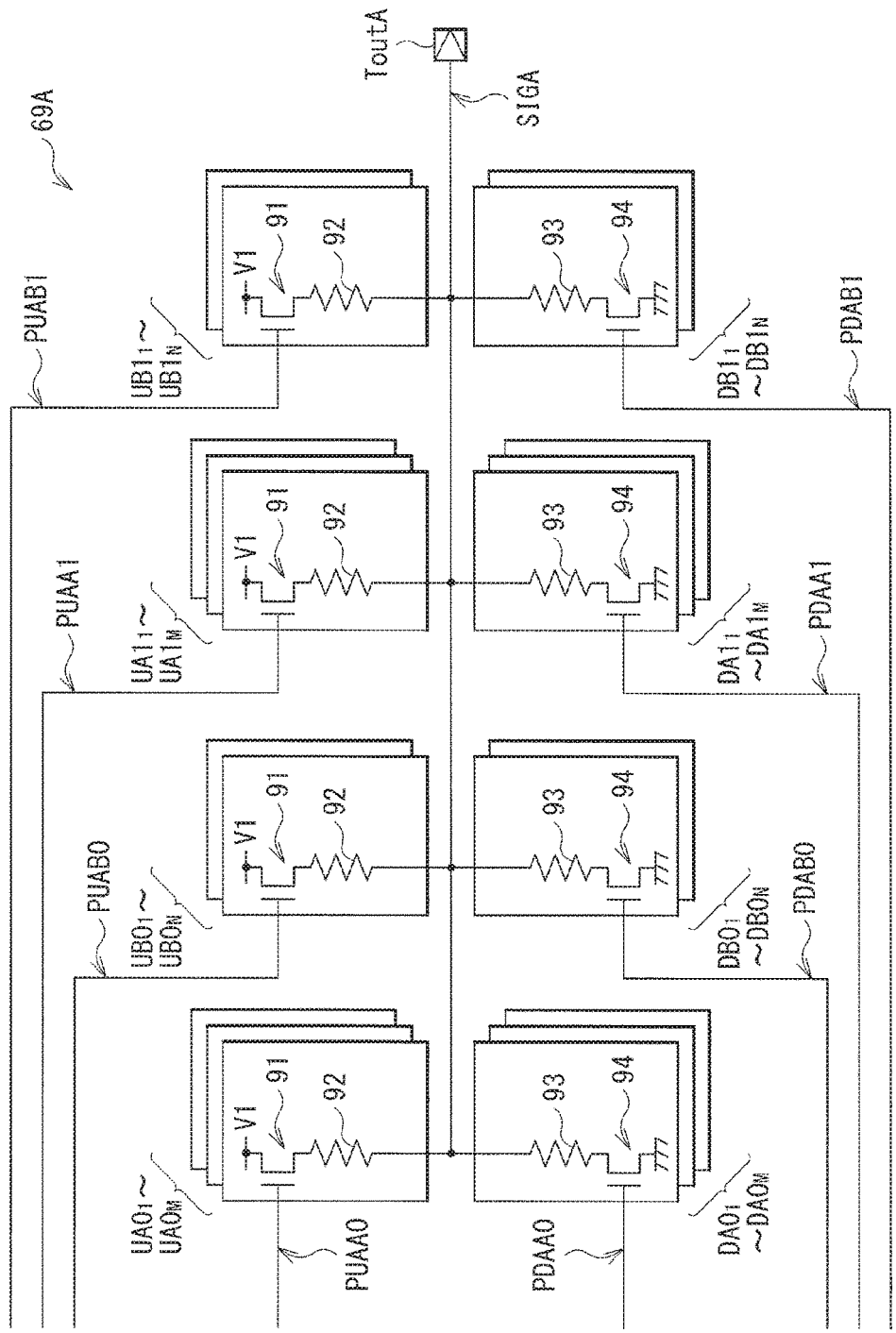

[ FIG. 20 ]

| SIGNAL PUA | SIGNAL PDA | PRE-EMPHASIS CONTROL SIGNAL MUP2 | PRE-EMPHASIS CONTROL SIGNAL MDN2 | SIGNAL PUAA0 | SIGNAL PUAB0 | SIGNAL PUAA1 | SIGNAL PUAB1 | SIGNAL PDAA0 | SIGNAL PDAB0 | SIGNAL PDAA1 | SIGNAL PDAB1 | SIGNAL SIGA |
|---|---|---|---|---|---|---|---|---|---|---|---|---|
| 1 | 0 | 0 | x | 1 | 1 | 1 | 1 | 0 | 0 | 0 | 0 | VH |
| 1 | 0 | 1 | 0 | 1 | 0 | 1 | 1 | 0 | 0 | 0 | 1 | VHminus |
| 1 | 1 | 1 | 0 | 1 | 1 | 0 | 1 | 1 | 0 | 0 | 0 | VMplus |
| 1 | 1 | 0 | 0 | 1 | 1 | 0 | 0 | 1 | 1 | 0 | 0 | VM |
| 1 | 1 | 0 | 1 | 0 | 0 | 0 | 0 | 1 | 1 | 0 | 1 | VMminus |
| 0 | 1 | 0 | 1 | 0 | 1 | 0 | 0 | 1 | 1 | 1 | 0 | VLplus |
| 0 | 1 | x | 0 | 0 | 0 | 0 | 0 | 1 | 1 | 1 | 1 | VL |

[FIG. 21A]
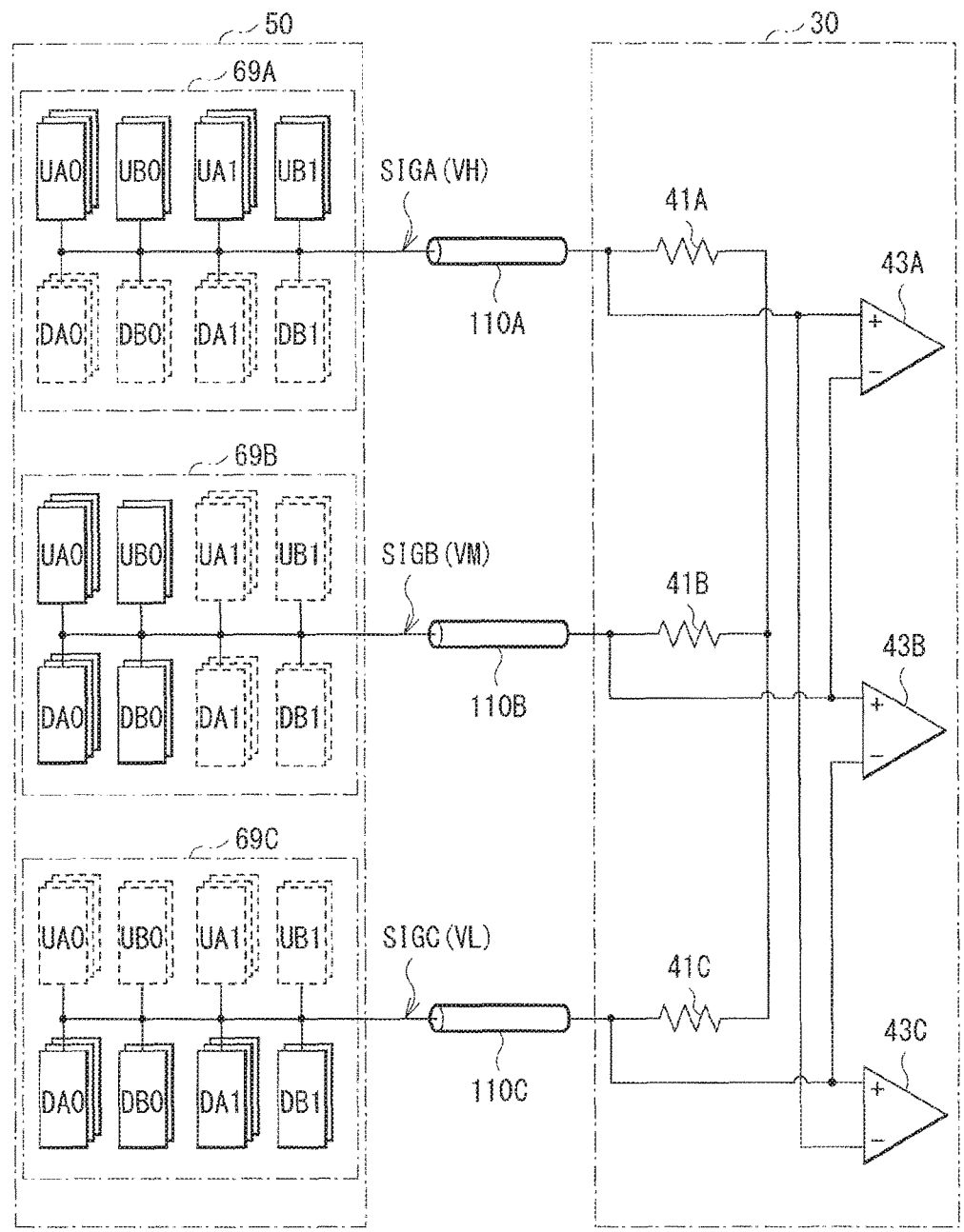

[ FIG. 21B ]
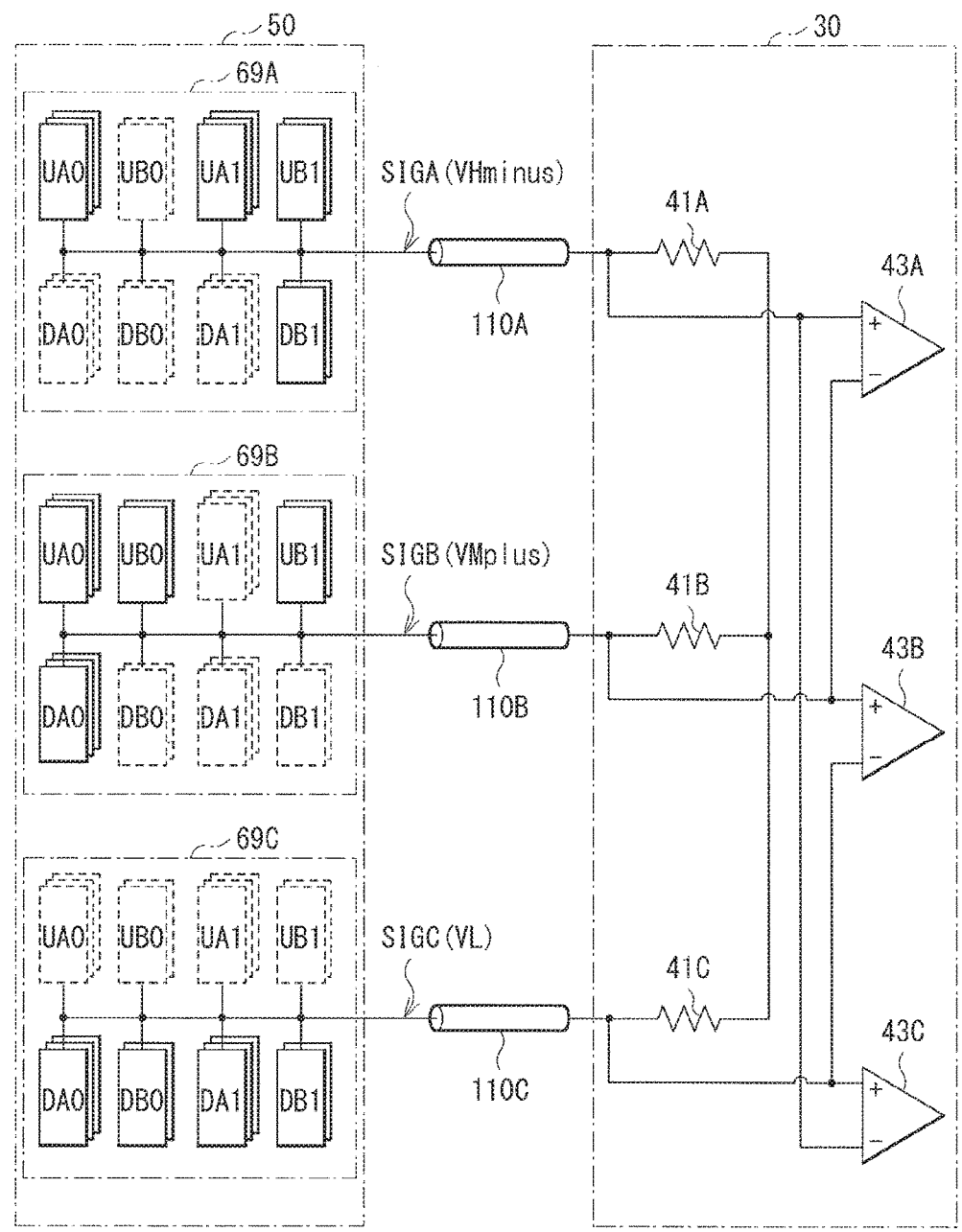

[ FIG. 21C ]
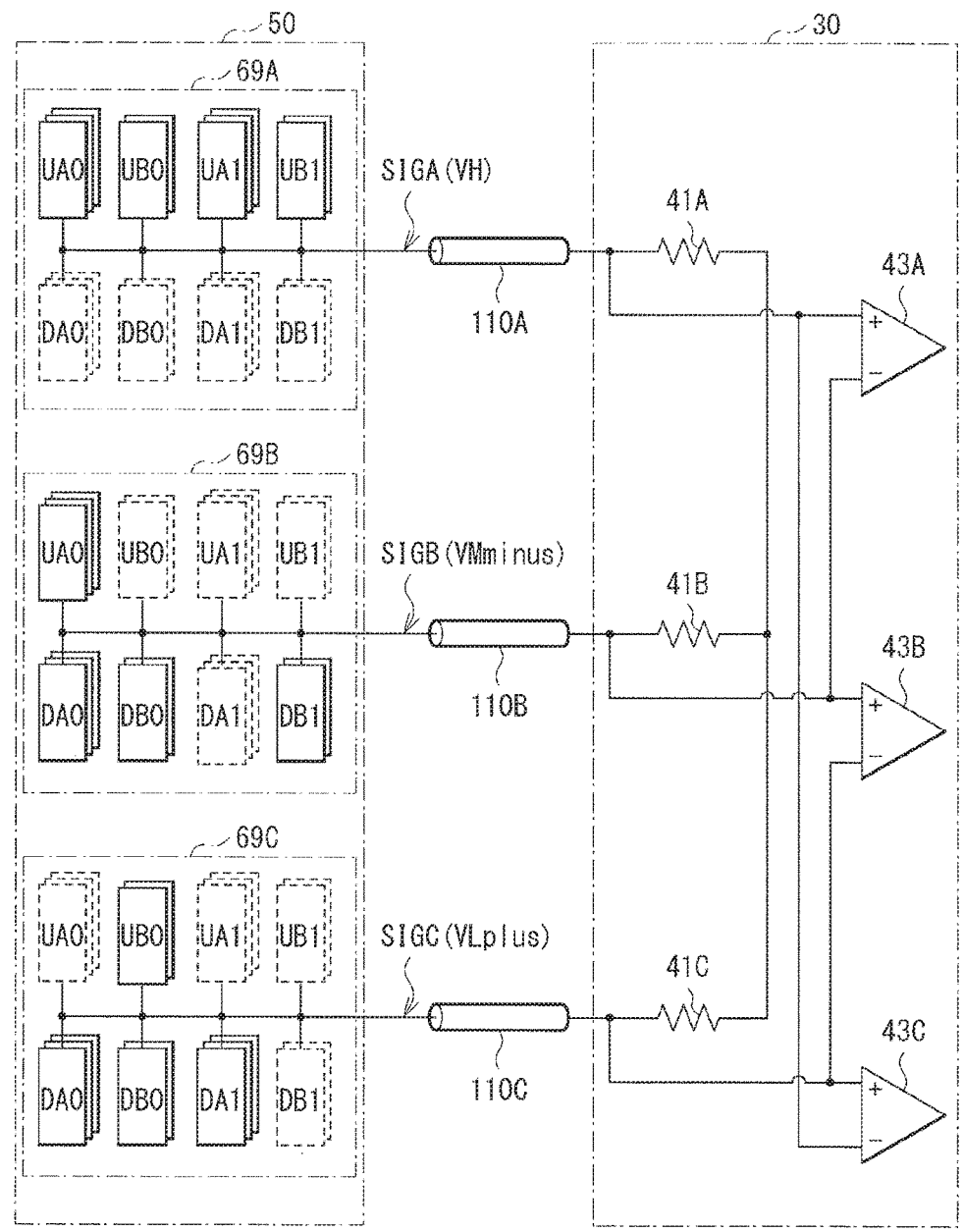

[ FIG. 22A ]
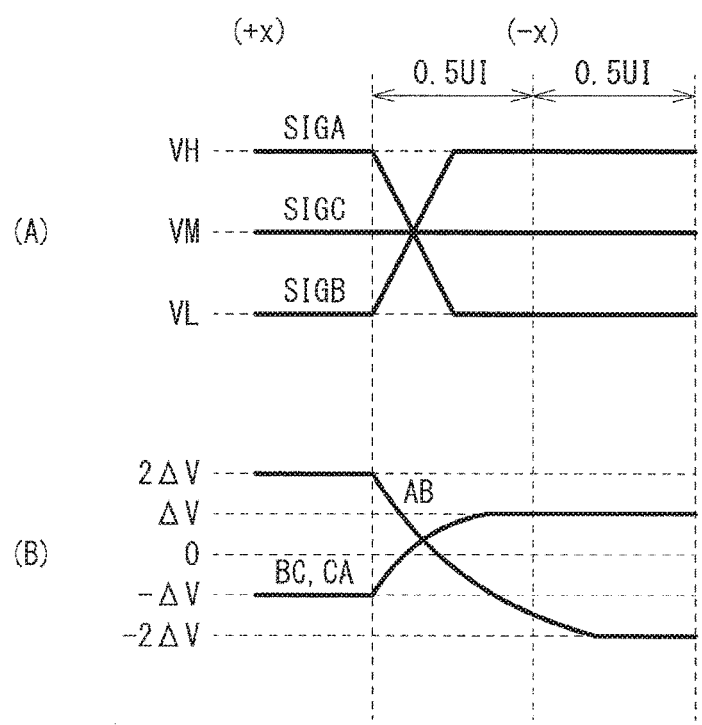

[ FIG. 22B ]
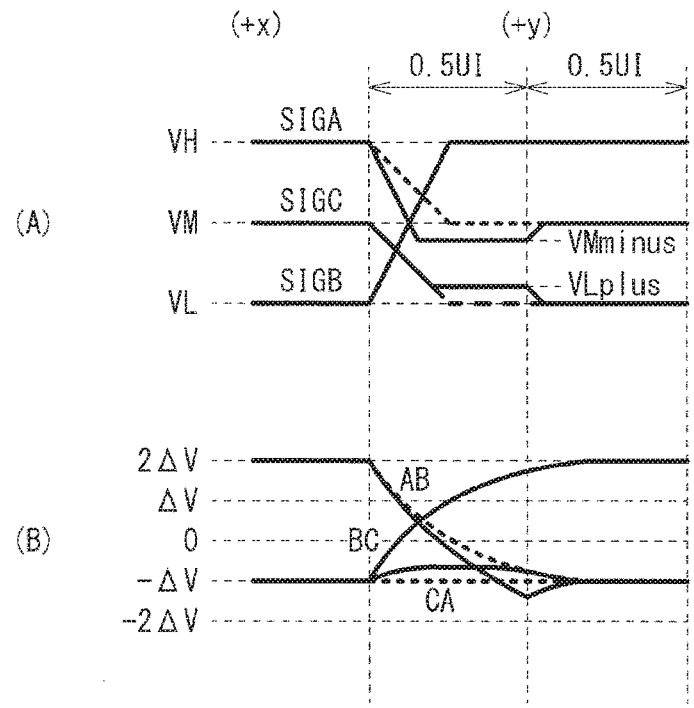
[ FIG. 22C ]
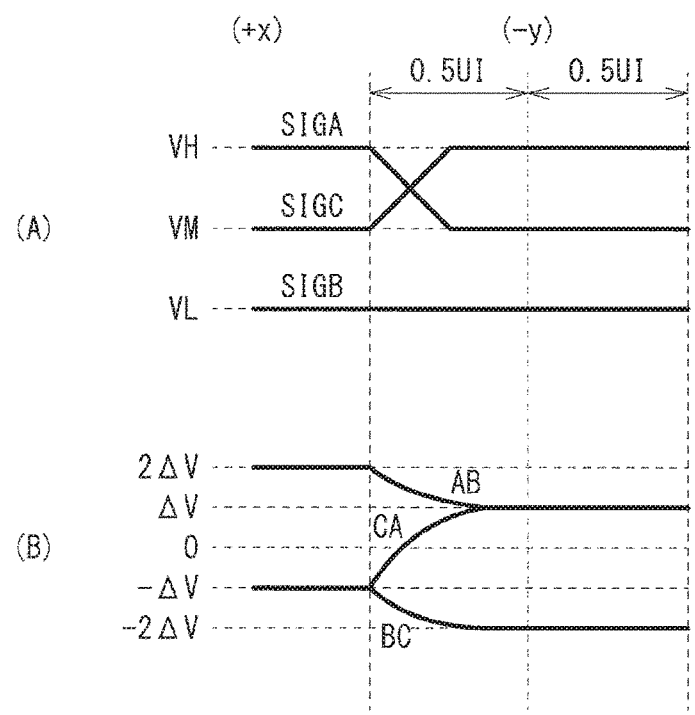

[ FIG. 22D ]
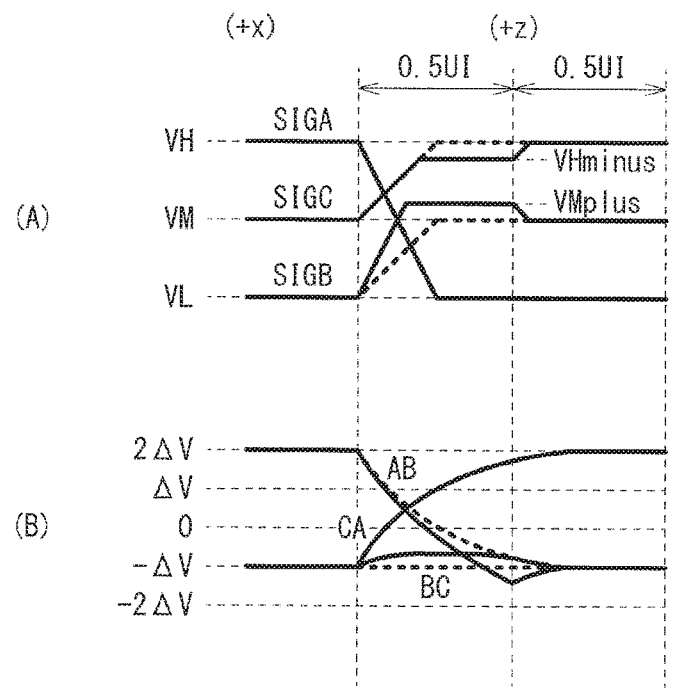
[ FIG. 22E ]
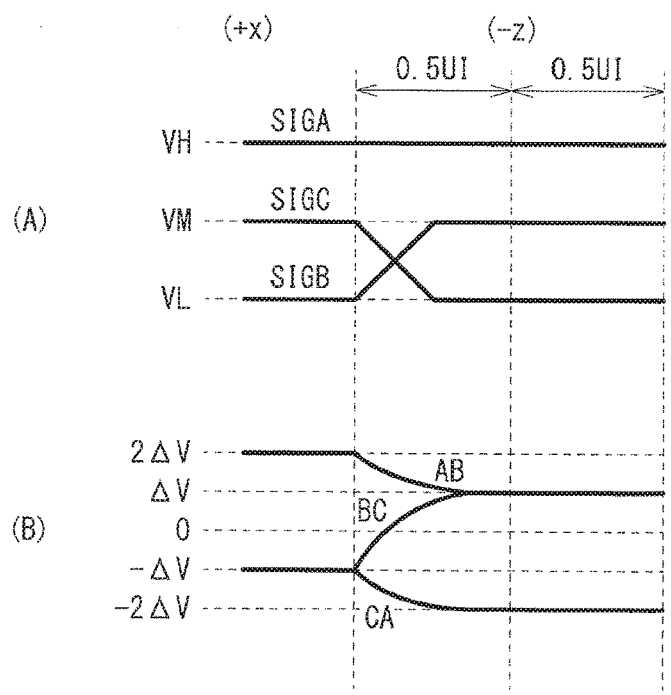

[ FIG. 23 ]
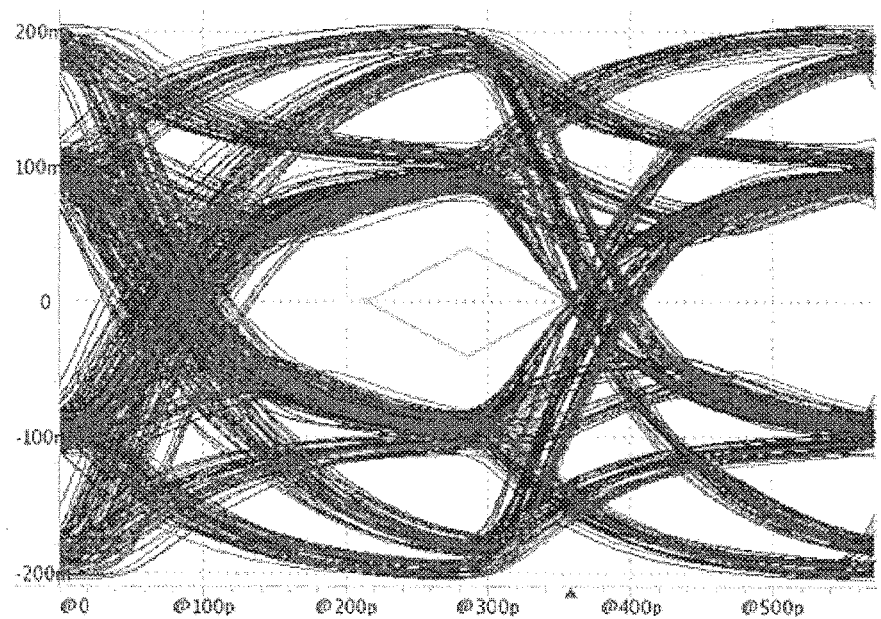
[ FIG. 24 ]
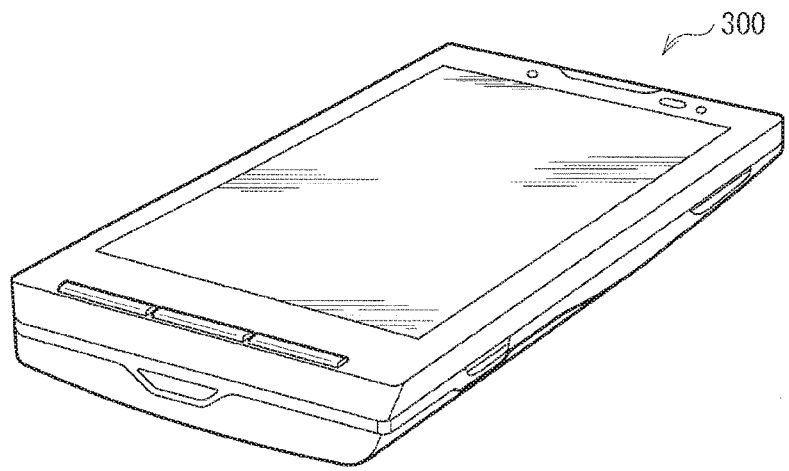

[FIG. 25]
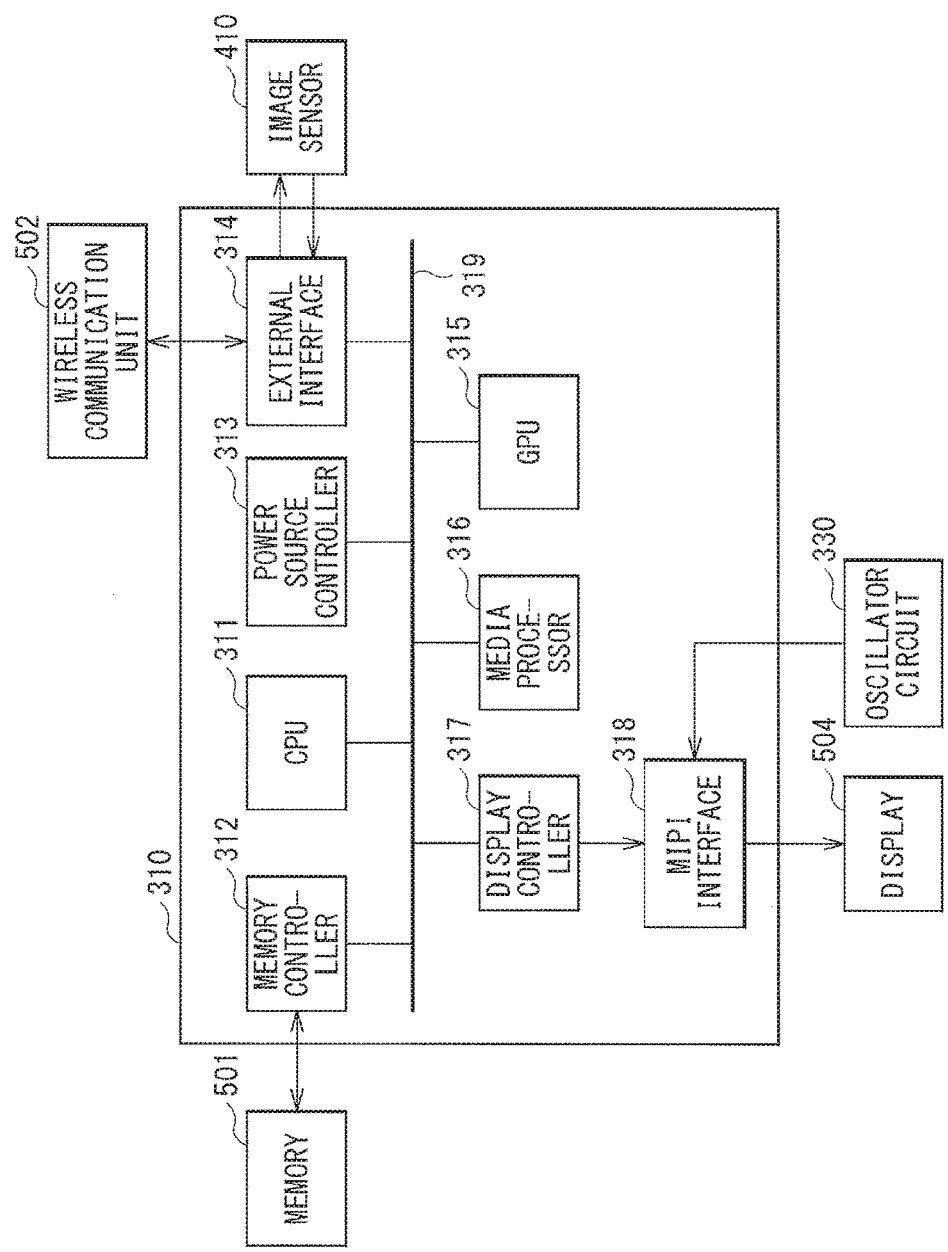

[FIG. 26]
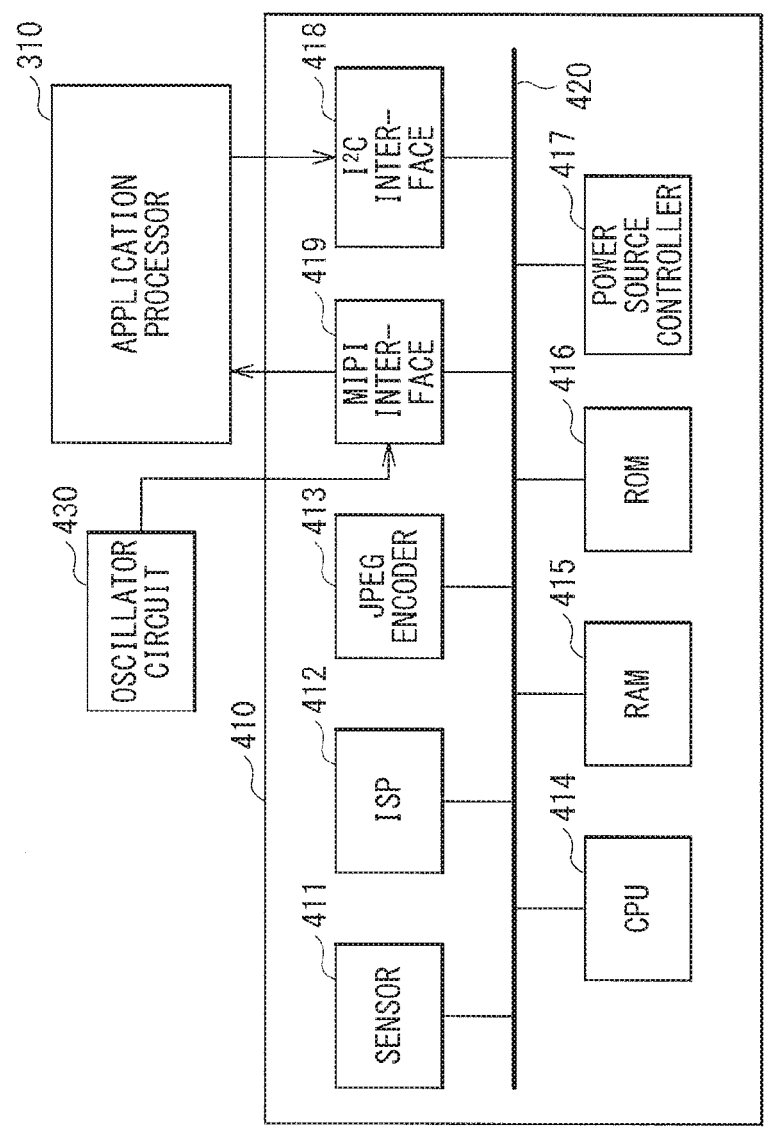

[FIG. 27]
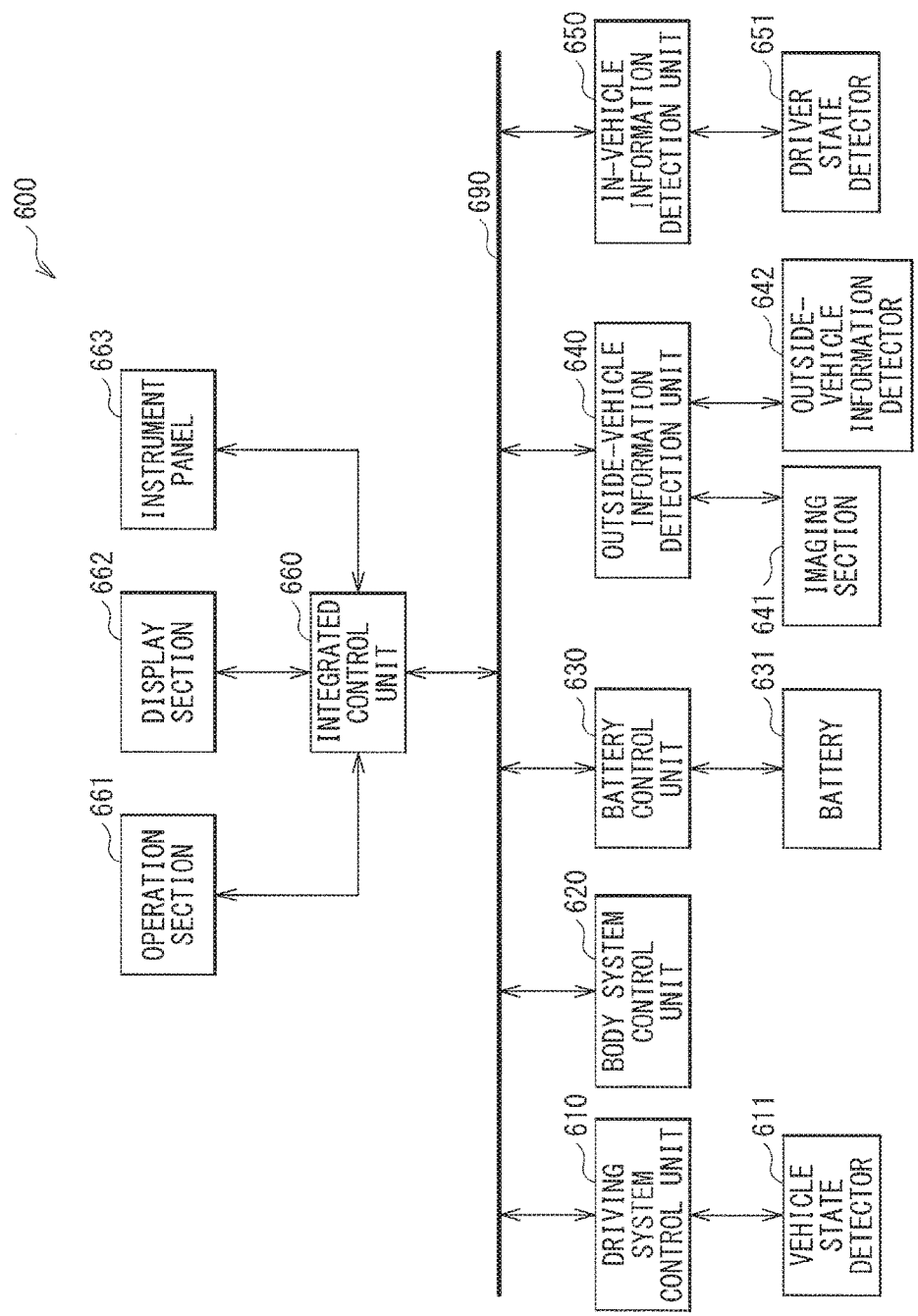

TRANSMISSION DEVICE, TRANSMISSION METHOD, AND COMMUNICATION SYSTEM

TECHNICAL FIELD

The present disclosure relates to a transmission device that transmits a signal, a transmission method used in such a transmission device, and a communication system including such a transmission device.

BACKGROUND ART

In association with high functionality and multi-functionality of electronic apparatuses in recent years, the electronic apparatuses include various devices such as a semiconductor chip, a sensor, and a display device. A lot of pieces of data are exchanged between these devices, and the amount of such data has been increased with high functionality and multi-functionality of the electronic apparatuses. Accordingly, the data are frequently exchanged with use of a high-speed interface that allows for transmission and reception of data at several Gbps, for example.

In order to improve communication performance in the high-speed interface, various technologies have been disclosed. For example, PTLs 1 and 2 each disclose a communication system that transmits three differential signals with use of three transmission paths. Moreover, for example, PLT 3 discloses a communication system that performs pre-emphasis.

CITATION LIST

Patent Literature

PTL 1: Japanese Unexamined Patent Application Publication No. H06-261092
PTL 2: U.S. Pat. No. 8,064,535
PTL 3: Japanese Unexamined Patent Application Publication No. 2011-142382

As described above, in the communication system, an improvement in communication performance is desired, and a further improvement in communication performance is expected.

It is desirable to provide a transmission device, a transmission method, and a communication system that allow for enhancement of communication performance.

SUMMARY OF THE INVENTION

A transmission device according to an embodiment of the present disclosure includes a driver unit and a controller. The driver unit transmits a data signal with use of a first voltage state, a second voltage state, and a third voltage state interposed between the first voltage state and the second voltage state, and is configured to make a voltage in the third voltage state changeable. The controller changes the voltage in the third voltage state to cause the driver unit to perform emphasis.

A transmission method according to an embodiment of the present disclosure includes: transmitting a data signal with use of a first voltage state, a second voltage state, and a third voltage state interposed between the first voltage state and the second voltage state, and changing a voltage in the third voltage state to perform emphasis.

A communication system according to an embodiment of the present disclosure includes a transmission device and a reception device. The transmission device includes a driver unit and a controller. The driver unit transmits a data signal with use of a first voltage state, a second voltage state, and a third voltage state interposed between the first voltage state and the second voltage state, and is configured to make a voltage in the third voltage state changeable. The controller changes the voltage in the third voltage state to cause the driver unit to perform emphasis.

In the transmission device, the transmission method, and the communication system according to the embodiments of the present disclosure, the data signal is transmitted with use of the first voltage state, the second voltage state, and the third voltage state. The voltage in the third voltage state is changeable. Further, the voltage in the third voltage state is changed to perform emphasis.

According to the transmission device, the transmission method, and the communication system of the embodiments of the present disclosure, the voltage in the third voltage state interposed between the first voltage state and the second voltage state is changed to perform emphasis, which makes it possible to enhance communication performance. It is to be noted that effects described here are not necessarily limited and may include any of effects described in the present disclosure.

BRIEF DESCRIPTION OF THE DRAWINGS

FIG. 1 is a block diagram illustrating a configuration example of a communication system according to an embodiment of the present disclosure.

FIG. 2 is an explanatory diagram illustrating voltage states of signals to be transmitted and received by the communication system illustrated in FIG. 1.

FIG. 3 is an explanatory diagram illustrating transition of a symbol to be transmitted and received by the communication system illustrated in FIG. 1.

FIG. 4 is a block diagram illustrating a configuration example of a transmitter illustrated in FIG. 1.

FIG. 5 is a table illustrating an operation example of a transition detector illustrated in FIG, 4.

FIG. 6 is a table illustrating an operation example of an output unit illustrated in FIG. 4.

FIG. 7 is a block diagram illustrating a configuration example of an output unit according to a first embodiment.

FIG. 8 is a timing waveform diagram illustrating an operation example of a timing controller illustrated in FIG. 7.

FIG. 9 is a block diagram illustrating a configuration example of a receiver illustrated in FIG. 1.

FIG. 10 is an explanatory diagram illustrating an example of a reception operation of the receiver illustrated in FIG. 9.

FIG. 11 is another explanatory diagram illustrating an example of a reception operation of the receiver illustrated in FIG. 9.

FIG. 12 is an eye diagram schematically illustrating a characteristic example of the communication system.

FIG. 13A is a timing waveform diagram illustrating an operation example of a communication system according to the first embodiment.

FIG. 13B is another timing waveform diagram illustrating an operation example of the communication system according to the first embodiment, FIG. 13C is another timing waveform diagram illustrating an operation example of the communication system according to the first embodiment.

FIG. 13D is another timing waveform diagram illustrating an operation example of the communication system according to the first embodiment.

FIG. 13E is another timing waveform diagram illustrating an operation example of the communication system according to the first embodiment.

FIG. 14A is an eye diagram illustrating a characteristic example of the communication system according to the first embodiment.

FIG. 14B is another eye diagram illustrating a characteristic example of the communication system according to the first embodiment.

FIG. 14C is another eye diagram illustrating a characteristic example of the communication system according to the first embodiment.

FIG. 14D is another eye diagram illustrating a characteristic example of the communication system according to the first embodiment.

FIG. 15A is a timing waveform diagram illustrating an operation example of a communication system according to a comparative example.

FIG. 15B is another timing waveform diagram illustrating an operation example of the communication system according to the comparative example.

FIG. 15C is another timing waveform diagram illustrating an operation example of the communication system according to the comparative example.

FIG. 15D is another timing waveform diagram illustrating an operation example of the communication system according to the comparative example.

FIG. 15E is another timing waveform diagram illustrating an operation example of the communication system according to the comparative example.

FIG. 16 is a block diagram illustrating a configuration example of an output unit according to a modification example of the first embodiment.

FIG. 17 is a circuit diagram illustrating a configuration example of a driver unit illustrated in FIG. 16.

FIG. 18 is a block diagram illustrating a configuration example of an output unit according to a second embodiment, FIG. 19 is a circuit diagram illustrating a configuration example of a driver unit illustrated in FIG. 18.

FIG. 20 is a table illustrating an operation example of the output unit illustrated in FIG. 18.

FIG. 21A is a schematic view of an operation example of the output unit illustrated in FIG. 18.

FIG. 21B is another schematic view of an operation example of the output unit illustrated in FIG. 18.

FIG. 21C is another schematic view of an operation example of the output unit illustrated in FIG. 18.

FIG. 22A is a timing waveform diagram illustrating an operation example of a communication system according to the second embodiment.

FIG. 22B is another timing waveform diagram illustrating an operation example of the communication system according to the second embodiment.

FIG. 22C is another timing waveform diagram illustrating an operation example of the communication system according to the second embodiment.

FIG. 22D is another timing waveform diagram illustrating an operation example of the communication system according to the second embodiment.

FIG. 22E is another timing waveform diagram illustrating an operation example of the communication system according to the second embodiment.

FIG. 23 is an eve diagram illustrating a characteristic example of the communication system according to the second embodiment.

FIG. 24 is a perspective view of an external appearance configuration of a smartphone to which the communication system according to the embodiment is applied.

FIG. 25 is a block diagram illustrating a configuration example of an application processor to which the communication system according to the embodiment is applied.

FIG. 26 is a block diagram illustrating a configuration example of an image sensor to which the communication system according to the embodiment is applied.

FIG. 27 is a block diagram illustrating a configuration example of a vehicle control system to which the communication system according to the embodiment is applied.

MODES FOR CARRYING OUT THE INVENTION

In the following, some embodiments of the present disclosure are described in detail with reference to the drawings. It is to be noted that description is given in the following order.
1. First Embodiment
2. Second Embodiment
3. Application Examples <1. First Embodiment>
[Configuration Example]

FIG. 1 illustrates a configuration example of a communication system (a communication system 1) according to a first embodiment. The communication system 1 improves communication performance by pre-emphasis.

The communication system 1 includes a transmission device 10, a transmission path 100, and a reception device 30. The transmission device 10 includes three output terminals ToutA, ToutB, and ToutC. The transmission path 100 includes three lines 110A, 110B, and 110C. The reception device 30 includes three input terminals TinA, TinB, and TinC. Further, the output terminal ToutA of the transmission device 10 and an input terminal TinA of the reception device 30 are coupled to each other through the line 110A. The output terminal ToutB of the transmission device 10 and the input terminal TinB of the reception device 30 are coupled to each other through the line 110B. The output terminal ToutC of the transmission device 10 and the input terminal TinC of the reception device 30 are coupled to each other through the line 110C. Characteristics impedances of the lines 110A to 110C are about 50 [Ω] in this example.

The transmission device 10 respectively outputs a signal SIGA, a signal SIGB, a signal SIGC from the output terminal ToutA, the output terminal ToutB, and the output terminal ToutC. Thereafter, the reception device 30 respectively receives the signal SIGA, the signal SIGB, and the signal SIGC through the input terminal TinA, the input terminal TinB, and the input terminal TinC. The signals SIGA, SIGB, and SIGC each possibly take three voltage states SH, SM, and SL. Herein, the voltage state SM is a state corresponding to a medium-level voltage VM. In other words, a voltage indicated by the voltage state SM includes, in addition to the medium-level voltage VM, a voltage in a case where pre-emphasis is performed on the medium-level voltage VM, as will be described later. Likewise, the voltage state SH is a state corresponding to a high-level voltage VH, and the voltage state SL is a state corresponding to a low-level voltage VL.

FIG. 2 illustrates voltage states of the signals SIG-A, SIGB, and SIGC. The transmission device 10 uses the three signals SIGA, SIGB, and SIGC to transmit six symbols "+x", "+y", "−y", "+z", and "−z". For example, in a case where the transmission device 10 transmits the symbol "+x", the transmission device 10 respectively sets the signal SIGA, the signal SIGB, and the signal SIGC to the voltage state SH (for example, the high-level voltage VH), the voltage state SL (for example, the low-level voltage VL), and the voltage state SM (for example, the medium-level voltage VM). In a case where the transmission device 10 transmits the symbol "−x", the transmission device 10 respectively sets the signal SIGA, the signal SIGB, and the signal SIGC to the voltage state SL, the voltage state SH, and the voltage state SM. In a case where the transmission device 10 transmits the symbol "+y", the transmission device 10 respectively sets the signal SIGA, the signal SIGB, and the signal SIGC to the voltage state SM, the voltage state SH, and the voltage state SL. In a case where the transmission device 10 transmits the symbol "−y", the transmission device 10 respectively sets the signal SIGA, the signal SIGB, and the signal SIGC to the voltage state SM, the voltage state SL, and the voltage state SH. In a case where the transmission device 10 transmits the symbol "+z", the transmission device 10 respectively sets the signal SIGA, the signal SIGB, and the signal SIGC to the voltage state SL, the voltage state SM, and the voltage state SH. In a case where the transmission device 10 transmits the symbol "−z", the transmission device 10 respectively sets the signal SIGA, the signal SIGB, and the signal SIGC to the voltage state SH, the voltage state SM, and the voltage state SL.

The transmission path 100 transmits a sequence of symbols with use of such signals SIGA, SIGB, and SIGC. In other words, three lines 110A, 110B, and 110C serves as one lane that transmits the sequence of symbols.

(Transmission Device 10)

The transmission device 10 includes a clock generator 11, a processor 12, and a transmitter 20, as illustrated in FIG. 1.

The clock generator 11 generates a clock signal TxCK. A frequency of the clock signal TxCK is, for example, 2.5 [GHz]. It is to be noted that the frequency is not limited thereto, and, for example, in a case where a circuit in the transmission device 10 is configured with use of a so-called half-rate architecture, it is possible to set the frequency of the clock signal TxCK to 1.25 [GHz]. The clock generator 11 is configured with use of, for example, a PLL (Phase Locked Loop), and generates the clock signal TxCK on the basis of, for example, a reference clock (not illustrated) supplied from outside of the transmission device 10. Thereafter, the clock generator 11 supplies the clock signal TxCK to the processor 12 and the transmitter 20.

The processor 12 performs predetermined processing to generate transition signals TxF0 to TxF6, TxR0 to TxR6, and TxP0 to TxP6. Herein, a group of the transmission signals TxF0, TxR0, and TxP0 indicates a symbol transition in a sequence of symbols that is to be transmitted by the transmission device 10. Likewise, a group of the transition signals TxF1, TxR1, and TxP1 indicates a symbol transition, a group of the transition signals TxF2, TxR2, and TxP2 indicates a symbol transition, a group of the transition signals TxF3, TxR3, and TxP3 indicates a symbol transition, a group of the transition signals TxF4, TxR4, and TxP4 indicates a symbol transition, a group of the transition signals TxF5, TxR5, and TxP5 indicates a symbol transition, and a group of the transition signals TxF6, TxR6, and TxP6 indicates a symbol transition. In other words, the processor 12 generates seven groups of transition signals. Hereinafter, on an as-needed basis, transition signals TxF, TxR, and TxP are used as indication of any of the seven groups of transition signals.

FIG. 3 illustrates a relationship between the transition signals TxF, TxR, and TxP and symbol transitions. Numerical values of three digits given to each transition indicate values of the transition signals TxF, TxR, and TxP in this order.

The transition signal TxF (Flip) causes a symbol transition between "+x" and "−x", a symbol transition between "+y" and "−y", and a symbol transition between "+z" and "−z". Specifically, in a case where the transition signal TxF is "1", a transition is made to change the polarity of the symbol (for example, from "+x" to "−x"), and in a case where the transition signal TxF is "0", such a transition is not made.

The transition signals TxR (Rotation) and TxP (Polarity) cause symbol transitions between "+x" and a symbol other than between "+y" and a symbol other than "−y", and between "+z" and a symbol other than "−z". Specifically, in a. case where the transition signals TxR and TxP are respectively "1" and "0", a transition is made in a clockwise direction in FIG. 3 while keeping the polarity of the symbol (for example, from "±x" to "+y"), and in a case Where the signals TxR and TxP are respectively "1" and "1", a transition is made in the clockwise direction in FIG. 3 while changing the polarity of the symbol (for example, from "+x" to "−y"). Moreover, in a case where the transition signals TxR and TxP are respectively "0" and "0", a transition is made in a counterclockwise direction in FIG. 3 While keeping the polarity of the symbol (for example, from "+x" to "+z"), and in a case where the transition signals TxR and TxP are respectively "0" and "1", a transition is made in the counterclockwise direction in FIG. 3 while changing the polarity of the symbol (for example, from "+x" to "−z").

The processor 12 generates such seven groups of the transition signals TxF, TxR. and TxP. Thereafter, the processor 12 supplies the seven groups of the transition signals TxF, TxR, and TxP (the transition signals TxF0 to TxF6, TxR0 to TxR6, and TxP0 to TxP6) to the transmitter 20.

The transmitter 20 generates the signals SIGA, SIGB, and SIGC on the basis of the transition signals TxF0 to TxF6, TxR0 to TxR6, and TxP0 to TxP6.

FIG. 4 illustrates a configuration example of the transmitter 20. The transmitter 20 includes serializers 21F, 21R, and 21P, a transmission symbol generator 22, a transition detector 25, and an output unit 26.

The serializer 21F serializes the transition signals TxF0 to TxF6 in this order on the basis of the transition signals TxF0 to TxF6 and the clock signal TxCK to generate a transition signal TxF9. The serializer 21R serializes the transition signals TxR0 to TxR6 in this order on the basis of the transition signals TxR0 to TxR6 and the clock signal TxCK to generate a transition signal TxR9. The serializer 21P serializes the transition signals TxP0 to TxP6 in this order on the basis of the transition signals TxP0 to TxP6 and the clock signal TxCK to generate a transition signal TxP9.

The transmission symbol generator 22 generates symbol signals Tx1, Tx2, and Tx3 on the basis of the transition signals TxF9, TxR9. and TxP9 and the clock signal TxCK. The transmission symbol generator 22 includes a signal generator 23 and a flip-flop 24.

The signal generator 23 generates the symbol signal Tx1, Tx2, and Tx3 on the basis of the transition signals TxF9, TxR9, and TxP9 and symbol signals D1, D2, and D3. Specifically, the signal generator 23 determines a symbol NS after the transition as illustrated in FIG. 3 on the basis of a symbol indicated by the symbol signals D1, D2, and D3 (a symbol DS before the transition) and the transition signals TxF9, TxR9, and TxP9, and outputs the symbol NS as the symbol signals Tx1, Tx2, and Tx3.

The flip-flop 24 samples the symbol signals Tx1, Tx2, and Tx3 on the basis of the clock signal TxCK and respectively outputs sampling results of the symbol signals Tx1, Tx2, and Tx3 as the symbol signals D1, D2, and D3.

FIG. 5 illustrates an operation example of the transmission symbol generator 22. FIG. 5 illustrates the symbol NS generated on the basis of the symbol DS indicated by the symbol signals D1, D2, and D3 and the transition signals TxF9, TxR9, and TxP9. Description is given with reference to an example in which the symbol DS is "+x". In a case where the transition signals TxF9, TxR9, and TxP9 are "000", the symbol NS is "+z", in a case where the transition signals TxF9, TxR9, and TxP9 are "001" the symbol NS is "−z", in a case where the transition signals TxF9, TxR9, and TxP9 are "010", the symbol NS is "−z", in a case where the transition signals TxF9, TxR9, and TxP9 are "011", the symbol NS is "−y", and in a case where the transition signals TxF9, TxR9, and TxP9 is "1xx", the symbol NS is "−x". Herein, "x" indicates that a signal may be either "1" or "0". This also applies to a case where the symbol DS is "−x", a case where the symbol DS is "+y", a case where the symbol DS is "−y", a case where the symbol DS is "+z", and a case where the symbol DS is "−z".

The transition detector 25 generates pre-emphasis control signals MUP and NIDN on the basis of the transition signals TxF9, TxR9, and TxP9 and the symbol signals D1, D2, and D3. Specifically, in a case where the transition signals TxF9, TxR9, and TxP9 are "000" and the symbol DS indicated by the symbol signals D1, D2, and D3 are "+x", "+y", and "+z", and in a case where the transition signals TxF9, TxR9, and TxP9 are "010" and the symbol DS indicated by the symbol signals D1, D2, and D3 are "−x", "−y", and "−z", the transition detector 25 respectively sets the pre-emphasis control signal MUP and the pre-emphasis control signal MDN to "1" (active) and "0" (inactive), as indicated by WUP circled by a solid line in FIG. 5. Moreover, in a case where the transition signals TxF9, TxR9, and TxP9 are "000" and the symbol DS indicated by the symbol signals D1, D2, and D3 is "−x", "−y", and "−z", and in a case where the transition signals TxF9, TxR9. and TxP9 are "010" and the symbol DS indicated by the symbol signals D1, D2, and D3 is "+z", "+v", and "+z", the transition detector 25 respectively sets the pre-emphasis control signal MDN and the pre-emphasis control signal MUP to "1" (active) and "0" (inactive) as indicated by WDN circled by a broken line in FIG. 5. Further, transition detector 25 sets both the pre-emphasis control signals MUP and MDN to "0" (inactive) in other cases. In other words, as will be described later, in a case where the transition signals TxF9, TxR9, and TxP9 are "000" or "010", there is a possibility that a transition time of any of a difference AB between the signal SIGA and the signal SIGB, a difference BC between the signal SIGB and the signal SIGC, and a difference CA between the signal SIGC and the signal SIGA becomes long. Accordingly, the transition detector 25 confirms, on the basis of the transition signals TxF9, TxR9, and TxP9 and the symbol signals D1, D2, and D3, whether or not the symbol transition is a symbol transition having the possibility that the transition time of any of the differences AB, BC, and CA becomes long, and generates the pre-emphasis control signals MUP and MDN on the basis of a thus-obtained result.

The output unit 26 generates the signals SIGA, SIGB, and SIGC on the basis of the symbol signals Tx1, Tx2, and Tx3 and the clock signal TxCK.

FIG. 6 illustrates an operation example of the output unit 26. For example, in a case where the symbol signal Tx1, Tx2, and Tx3 are "100", the output unit 26 respectively sets the signal SIGA, the signal SIGB, and the signal SIGC to the voltage state SH (for example, the high-level voltage VH), the voltage state SL (for example, the low-level voltage VL), and the voltage state SM (for example, the medium-level voltage VM). In other words, the output unit 26 generates the symbol "+x". Moreover, for example, in a case where the symbol signals Tx1, Tx2, and Tx3 are "011", the signal SIGA, the signal SIGB, and the signal SIGC are respectively set to the voltage state SL, the voltage state SH, and the voltage state SM. In other words, the output unit 26 generates the symbol "−x". Further, for example, in a case where the symbol signals Tx1, Tx2, and Tx3 are "010", the signal SIGA, the signal SIGB, and the signal SIGC are respectively set to the voltage state SM, the voltage state SH, and the voltage state SL. In other words, the output unit 26 generates the symbol "−y". Furthermore, for example, in a case where the symbol signals Tx1, Tx2, and Tx3 are "101", the signal SIGA, the signal SIGB, and the signal SIGC are respectively set to the voltage state SM, the voltage state SL, and the voltage state SH. In other words, the output unit 26 generates the symbol "−y". Moreover, for example, in a case where the symbol signals Tx1, Tx2, and Tx3 are "001", the signal SIGA, the signal SIGB, and the signal SIGC are respectively set to the voltage state SL, the voltage state SM, and the voltage state SH. In other words, the output unit 26 generates the symbol "+z". Further, for example, in a case where the symbol signals Tx1, Tx2, and Tx3 are "110", the signal SIGA, the signal SIGB, and the signal SIGC are respectively set to the voltage state SH, the voltage state SM, and the voltage state SL. In other words, the output unit 26 generates the symbol "−z".

FIG. 7 illustrates a configuration example of the output unit 26. The output unit 26 includes a driver controller 27, a timing controller 27T, pre-emphasis controllers 28A, 28B, and 28C, and driver units 29A, 29B, and 29C.

The driver controller 27 generates signals PUA, PDA, PUB, PDB, PUC, and PDC on the basis of the symbol signals Tx1, Tx2, and Tx3 and the clock signal TxCK. Specifically, as illustrated in FIG. 6, for example, in a case where the signal SIGA is set to the voltage state SH (for example, the high-level voltage VH), the driver controller 27 respectively sets the signal PUA and the signal PDA to "1" and "0", and in a case where the signal SIGA is set to the voltage state SL (for example, the low-level voltage VL), the driver controller 27 respectively sets the signal PDA and the signal PUA to "1" and "0", and in a case where the signal SIGA is set to the voltage state SM (for example, the medium-level voltage VM), the driver controller 27 sets both the signals PUA and PDA to "1". This also applies to the signals PUB and PDB and the signals PUC and PDC. Thereafter, the driver controller 27 supplies the signals PUA and PDA to the pre-emphasis controller 28A, supplies the signals PUB and PDB to the pre-emphasis controller 28B, and supplies the signals PVC and PDC to the pre-emphasis controller 28C.

On the basis of the pre-emphasis control signals MUP and MDN and the clock signal TxCK, the timing controller 27T performs timing adjustment on the pre-emphasis control signal MUP to generate a pre-emphasis control signal MUP2, and performs timing adjustment on the pre-emphasis control signal MDN to generate a pre-emphasis control signal MDN2. Thereafter, the timing controller 27T supplies the pre-emphasis control signals MUP2 and MDN2 to the pre-emphasis controllers 28A to 28C.

FIG. 8 illustrates an example of waveforms of the signals PUA and PDA and pre-emphasis control signals MUP2 and MDN2 that are to be supplied to the pre-emphasis controller 28A. The signals PUA and PDA may change in every time period (unit interval UI) corresponding to one symbol. In this example, the signal PUA changes from a low level to a high level at a timing t1, changes from the high level to the low level at a timing t3 after a lapse of a time period corresponding to two unit intervals UI from the timing t1, changes from the low level to the high level at a timing t4 after a lapse of a time period corresponding to one unit interval UI from the timing t3, and changes from the high level to the low level at a timing t5 after a lapse of a time period corresponding to one unit interval UI from the timing t4 (FIG. 8(A)). Moreover, the signal PDA changes from the high level to the low level at a timing t2 after a lapse of a time period corresponding to one unit interval UI from the timing t1, and changes from the low level to the high level at the timing t3 (FIG. 8(B)). Moreover, the pre-emphasis control signals MUP2 and MDN2 are changeable from the low level to the high level at a start timing of the unit interval UI, and are changeable from the high level to the low level at a timing after a lapse of a time period corresponding to a half (0.5 UI) of the unit interval UI from the start timing of the unit interval UI. In this example, the pre-emphasis control signal MUP2 changes from the low level to the high level at the timing t1, and changes from the high level to the low level at a timing after a lapse of a time period corresponding to a half (0.5 UI) of the unit interval UI from the timing t1 (FIG. 8(C)). Further, the pre-emphasis control signal MDN2 changes from the low level to the high level at the timing t4, and changes from the high level to the low level at a timing after a lapse of a time period corresponding to a half (0.5 UI) of the unit interval UI from the timing t4 (FIG. 8(D)). In this example, signals to be supplied to the pre-emphasis controller 28A are described; however, this also applies to signals to be supplied to the pre-emphasis controllers 28B and 28C. As described above, the timing controller 27T performs timing adjustment on the pre-emphasis control signals MUP and MDN to change the pre-emphasis control signals MUP2 and MDN2 from the low level to the high level at the start timing of the unit interval UI and change the pre-emphasis control signals MUP2 and MDN2 from the high level to the low level at a timing after a lapse of a time period corresponding to a half (0.5 UI) of the unit interval UI from that timing.

The pre-emphasis controller 28A generates signals PUA1 to PUA24 and PDA1 to PDA24 on the basis of the signals PUA and PDA and the pre-emphasis control signals MUP2 and MDN2. The driver unit 29A generates the signal SIGA on the basis of the signals PUA1 to PUA24 and PDA1 to PDA24. The driver unit 29A includes twenty four drivers 29A1 to 29A24 in this example. The driver 29A1 operates on the basis of the signals PUA1 and PDA1, and the driver 29A2 operates on the basis of the signals PUA2 and PDA2. This also applies to the drivers 29A3 to 29A23. The driver 29A24 operates on the basis of the signals PUA24 and PDA24. Output terminals of the drivers 29A1 to 29A24 are coupled to one another, and are coupled to the output terminal ToutA. It is to be noted that in this example, twenty four drivers 29A1 to 29A24 are provided; however, the number of drivers are not limited thereto. Alternatively, twenty three or less or twenty five or more drivers may be provided.

The pre-emphasis controller 28B generates signals PUB1 to PUB24 and PDB1 to PDB24 on the basis of the signals PUB and PDB and the pre-emphasis control signals MUP2 and MDN2, as with the pre-emphasis controller 28A. The driver unit 29B generates the signal SIGB on the basis of the signals PUB1 to PUB24 and PDB1 to PDB24, as with the driver unit 29A. The driver unit 29B includes twenty four drivers 29B1 to 29B24 in this example. Output terminals of the drivers 29B1 to 29B24 are coupled to one another, and are coupled to the output terminal ToutB.

The pre-emphasis controller 28C generates signals PUC1 to PUC24 and PDC1 to PDC24 on the basis of the signal PUC and PDC and the pre-emphasis control signals MUP2 and MDN2, as with the pre-emphasis controller 28A. The driver unit 29C generates the signal SIGC on the basis of the signals PUC1 to PUC24 and PDC1 to PDC24, as with the driver unit 29A. The driver unit 29C includes twenty four drivers 29C1 to 29C24 in this example. Output terminals of the drivers 29C1 to 29C24 are coupled to one another, and are coupled to the output terminal ToutC.

Next, configurations of the drivers 29A1 to 29A24, 29B1 to 29B24, and 29C1 to 29C24 are described with reference to the driver 29A1 as an example. The driver 29A1 includes transistors 91 and 94 and resistors 92 and 93. The transistors 91 and 94 in this example each are an N-channel MOS (Metal Oxide Semiconductor)-FET (Field Effect Transistor). A gate of the transistor 91 is supplied with the signal PUA1, a drain thereof is supplied with a voltage V1, and a source thereof is coupled to one end of the resistor 92. A gate of the transistor 94 is supplied with the signal PDA1, a drain thereof is coupled to one end of the resistor 93, and a source thereof is grounded. The one end of the resistor 92 is coupled to the source of the transistor 91, and the other end thereof is coupled to the other end of the resistor 93 and the output terminal ToutA of the transmission device 10. The one end of the resistor 93 is coupled to the drain of the transistor 94, and the other end thereof is coupled to the other end of the resistor 92 and the output terminal ToutA of the transmission device 10. In this example, the sum of a resistance value of on resistance of the transistor 91 and a resistance value of the resistor 92 is about 1000[Ω]. Likewise, the sum of a resistance value of on resistance of the transistor 94 and a resistance value of the resistor 93 is about 1000[Ω].

With this configuration, for example, the driver controller 27 sets a voltage state at the output terminal ToutA to one of the three voltage states SH, SM, and SL with use of the signals PUA and PDA. Specifically, for example, in a case where the voltage of the signal SIGA is set to the high-level voltage VH (the voltage state SH), the driver controller 27 respectively sets the signal PUA and the signal PDA to "1" and "0". This causes the pre-emphasis controller 28A to set twenty of the signals PUA1 to PUA24 to "1", and to set the remaining four of the signals PUA1 to PUA24 and the signals PDA1 to PDA24 to "0". At this time, in the driver unit 29A, twenty of the twenty four transistors 91 are turned on. As a result, the signal SIGA is set to the high-level voltage VH, and an output termination resistance (output impedance) of the driver unit 29A becomes about 50[Ω] (=1000/20). Moreover, in a case where the voltage of the signal SIGA is set to the low-level voltage VL (the voltage state SL), the driver controller 27 respectively sets the signal PDA and the signal PUA to "1" and "0". This causes the pre-emphasis controller 28A to set twenty of the signals PDA1 to PDA24 to "1", and to set the remaining four of the signals PDA1 to PDA24 and the signals PUA1 to PUA24 to "0". At this time, in the driver unit 29A, twenty of the twenty four transistors 94 are turned on. As a result, the signal SIGA is set to the low-level voltage VL, and the output termination resistance (output impedance) of the driver unit 29A becomes about 50[Ω].

Further, in a case where the voltage state at the output terminal ToutA is set to the voltage state SM, the driver controller 27 sets both the signal PUA and PDA to "1". At this time, in a case where both the pre-emphasis control signals MUP2 and MDN2 are "0", the pre-emphasis controller 28A sets ten of the signals PUA1 to PUA24 and ten of the signals PDA1 to PDA24 to "1", and sets the remaining fourteen of the signals PUA1 to PUA24 and the remaining fourteen of the signals PDA1 to PDA24 to "0". At this time, in the driver unit 29A, ten of the twenty four transistors 91 are turned on, and ten of the twenty four transistors 94 to turned on. As a result, the signal SIGA is set to the medium-level voltage VM, and the output termination resistance (output impedance) of the driver unit 29A becomes about 50[Ω]. Furthermore, in a case where the pre-emphasis control signal MUP2 is "1", and the pre-emphasis control signal MDN2 is "0", the pre-emphasis controller 28A sets (10+m) of the signals PUA1 to PUA24 and (10−m) of the signals PDA1 to PDA24 to "1", and the remaining (14−m) of the signals PUA1 to PUA24 and the remaining (14+m) of the signals PDAI to PDA24 to "0". Herein, "m" is a natural number of 1 or more. At this time, in the driver unit 29A, (10+m) of the twenty four transistors 91 are turned on, and (10−m) of the twenty four transistors 94 are turned on. As a result, the signal SIGA is set to a medium-level voltage VMplus that is slightly higher than the medium-level voltage VM, and the output termination resistance (output impedance) of the driver unit 29A becomes about 50[Ω]. Moreover, in a case where the pre-emphasis control signal MDN2 is "1", and the pre-emphasis control signal MUP2 is "0", the pre-emphasis controller 28A sets (10−m) of the signals PDA1 to PUA24 and (10+m) of the signals PDA1 to PDA24 to "1", and sets the remaining (14+m) of the signals PUA1 to PUA24 and the remaining (14−m) of the signals PDA1 to PDA24 to "0". At this time, in the driver unit 29A, (10−m) of the twenty four transistors 91 are turned on, and (10+m) of the twenty four transistors 94 are turned on. As a result, the signal SIGA is set to a medium-level voltage VMminus that is slightly lower than the medium-level voltage VM, and the output termination resistance (output impedance) of the driver unit 29A becomes about 50[Ω].

The driver controller 27 sets the voltage states at the output terminals ToutA., ToutB, and ToutC with use of the signals PUA, PDA, PUB, PDB, PUC, and PDC in such a manner. Moreover, the pre-emphasis controller 28A changes the numbers of the transistors 91 and 94 to be turned on, on the basis of the signals PUA and PDA and the pre-emphasis control signals MUP2 and MDN2, to set the voltage level of the signal SIGA upon setting the signal SIGA to the voltage state SM. Likewise, the pre-emphasis controller 28B changes the numbers of the transistors 91 and 94 to be turned on, on the basis of the signals PUB and PDB and the pre-emphasis control signals MUP2 and MDN2, to set the voltage level of the signal SIGB upon setting the signal SIGB to the voltage state SM. The pre-emphasis controller 28C changes the numbers of the transistors 91 and 94 to be turned on, on the basis of the signals PUC and PDC and the pre-emphasis control signals MUP2 and MDN2, to set the voltage level of the signal SIGC upon setting the signal SIGC to the voltage state SM.

At this time, in a case where the symbol transition is the symbol transition having the possibility that the transition time of any of the differences AB, BC, and CA becomes long upon changing the signal SIGA from the voltage state SH or the voltage state SL to the voltage state SM, the pre-emphasis controller 28A controls the driver unit 29A to set the voltage of the signal SIGA to the medium-level voltage VMplus or the medium-level voltage VMminus, as will be described later. Likewise, in a case where the symbol transition is the symbol transition having the possibility that the transition time of any of the differences AB, BC, and CA becomes long upon changing the signal SIGB from the voltage state SH or the voltage state SL to the voltage state SM, the pre-emphasis controller 28B controls the driver unit 29B to set the voltage of the signal SIGB to the medium-level voltage VMplus or the medium-level voltage VMminus. Moreover, in a case where the symbol transition is the symbol transition having the possibility that the transition time of any of the differences AB, BC, and CA becomes long upon changing the signal SIGC from the voltage state SH or the voltage state SL to the voltage state SM, the pre-emphasis controller 28C controls the driver unit 29C to set the voltage of the signal SIGC to the medium-level voltage VMplus and the medium-level voltage VMminus. This makes it possible to enhance communication performance in the communication system 1.

(Reception Device 30)

The reception device 30 includes a receiver 40 and a processor 32, as illustrated in FIG. 1.

The receiver 40 receives the signals SIGA, SIGB, and SIGC, and generates transition signals RxF, RxR, and RxP and a clock signal RxCK on the basis of the signals SIGA, SIGB, and SIGC.

FIG. 9 illustrates a configuration example of the receiver 40. The receiver 40 includes resistors 41A, 41B, and 41C, switches 42A, 42B, and 42C, amplifiers 43A, 43B, and 43C, a clock generator 44, flip-flops 45 and 46, and a signal generator 47.

The resistors 41A, 41B, and 41C each serve as a termination resistor in the communication system 1, and have a resistance value of about 50[Ω] in this example. One end of the resistor 41A is coupled to the input terminal TinA and is supplied with the signal SIGA, and the other end thereof is coupled to one end of the switch 42A. One end of the resistor 41B is coupled to the input terminal TinB and is supplied with the signal SIGB, and the other end thereof is coupled to one end of the switch 42B. One end of the resistor 41C is coupled to the input terminal TinC and is supplied with the signal SIGC, and the other end thereof is coupled to one end of the switch 42C.

The one end of the switch 42A is coupled to the other end of the resistor 41A, and the other end thereof is coupled to the other ends of the switches 42B and 42C. The one end of the switch 42B is coupled to the other end of the resistor 41B, and the other end thereof is coupled to the other ends of the switches 42A and 42C. The one end of the switch 42C is coupled to the other end of the resistor 41C, and the other end thereof is coupled to the other ends of the switches 42A and 42B. In the reception device 30, the switches 42A, 42B, and 42C are set to be on, and the resistors 41A to 41C serve as termination resistors.

A positive input terminal of the amplifier 43A is coupled to a negative input terminal of the amplifier 43C and the one end of the resistor 41A and is supplied with the signal SIGA, and a negative input terminal thereof is coupled to a positive input terminal of the amplifier 43B and the one end of the resistor 41B and is supplied with the signal SIGB. The positive input terminal of the amplifier 43B is coupled to the negative input terminal of the amplifier 43A and the one end of the resistor 41B and is supplied with the signal SIGB, and a negative input terminal thereof is coupled to a positive input terminal of the amplifier 43C and the one end of the resistor 41C and is supplied with the signal SIGC. The positive input terminal of the amplifier 43C is coupled to the negative input terminal of the amplifier 43B and the one end of the resistor 41C and is supplied with the signal SIGC, and the negative input terminal thereof is coupled to the positive input terminal of the amplifier 43A and the resistor 41A and is supplied with the signal SIGA.

With this configuration, the amplifiers 432A, 43B, and 43C respectively output a signal corresponding to the difference AB (SIGA−SIGB) between the signal SIGA and the signal SIGB, a signal corresponding to the difference BC (SIGB−SIGC) between the signal SIGB and the signal SIGC, and a signal corresponding to the difference CA (SIGC−SIGA) between the signal SIGC and the signal SIGA.

FIG. 10 illustrates an example of the signals SIGA to SIGC to be received by the receiver 40. For convenience of description, FIG. 10 illustrates waveforms in a case where the transmission device 10 does not perform a pre-emphasis operation. In this example, the receiver 40 receives six symbols "+x", "−y", "−z", "+z", "+y", and "−x" in this order. At this time, the voltage of the signal SIGA changes in order of VH, VM, VH, VL, VM, and VL, the voltage of the signal SIGB changes in order of VL, VM, VM, VH, and VH, and the voltage of the signal SIGC changes in order of VM, VH, VL, VL, and VM. Accordingly, the differences AB, BC, and CA also change. For example, the difference AB changes in order of $+2\Delta V$, $+\Delta V$, $+\Delta V$, $-\Delta V$, $-\Delta V$, and $-2\Delta V$, the difference BC changes in order of $-\Delta V$, $-2\Delta V$, $+\Delta V$, $-\Delta V$, $+2\Delta V$, and $+\Delta V$, and the difference CA changes in order of $-\Delta V$, $+\Delta V$, $-2\Delta V$, $+2\Delta V$, $-\Delta V$, and $+\Delta V$. Herein, $\Delta V$ is a difference between two adjacent voltages of the three voltages (the high-level voltage VH, the medium-level voltage VM, and the low-level voltage VL).

FIG. 11 illustrates an operation example of the amplifiers 43A, 43B, and 43C in a case where the receiver 40 receives the symbol "+x". It is to be noted that the switches 42A, 42B, and 42C are on, and are not thereby illustrated. In this example, the signal SIGA is the high-level voltage VH, the signal SIGB is the low-level voltage VL, and the signal SIGC is the medium-level voltage VM. In this case, a current Iin passes through the input terminal TinA, the resistor 41A, the resistor 41B, and the input terminal TinB in this order. Thereafter, the positive input terminal and the negative input terminal of the amplifier 43A are respectively supplied with the high-level voltage VH and the low-level voltage VL to cause the difference AB to be positive (AB>0). Accordingly, the amplifier 32A outputs "1". Moreover, the positive input terminal and the negative input terminal of the amplifier 43B are respectively supplied with the low-level voltage VL and the medium-level voltage VM to cause the difference BC to be negative (BC<0). Accordingly, the amplifier 43B outputs "0". Further, the positive input terminal and the negative input terminal of the amplifier 43C are respectively supplied with the medium-level voltage VM and the high-level voltage VH to cause the difference CA to be negative (CA<0). Accordingly, the amplifier 43C outputs "0".

The clock generator 44 generates the clock signal RxCK on the basis of output signals of the amplifiers 43A, 43B, and 43C.

The flip-flop 45 delays the output signals of the amplifiers 43A, 43B, and 43C by one clock of the clock signal RxCK and outputs the respective output signals. The flip-flop 46 delays three output signals of the flip-flop 45 by one clock of the clock signal RxCK and outputs the respective output signals.

The signal generator 47 generates the transition signals RxF, RxR, and RxP on the basis of the output signals of the flip-flops 45 and 46 and the clock signal RxCK. The transition signals RxF, RxR, and RxP respectively correspond to the transition signals TxF, TxR, and TxP (FIG. 4) in the transmission device 10, and each indicate a symbol transition. The signal generator 47 specifies a symbol transition (FIG. 3) on the basis of a symbol indicated by the output signals of the flip-flop 45 and a symbol indicated by the output signals of the flip-flop 46 to generate the transition signals RxF, RxR, and RxP.

The processor 32 (FIG. 1) performs predetermined processing on the basis of the transition signals RxF, RxR, and RxP and the clock signal RxCK.

Herein, the driver units 29A, 29B, and 29C correspond to specific examples of a "driver unit" in the present disclosure. The signals SIGH, SIGB, and SIGC correspond to specific examples of a "data signal" in the present disclosure. The transition detector 25 and the pre-emphasis controllers 28A, 28B, and 28C correspond to specific examples of a "controller" in the present disclosure. The transmission symbol generator 22 corresponds to a specific example of a "signal generator" in the present disclosure. The transistor 91 and the resistor 92 correspond to specific examples of a "first sub-circuit" in the present disclosure. The transistor 94 and the resistor 93 correspond to specific examples of a "second sub-circuit" in the present disclosure.

[Operation and Workings]

Next, description is given of operation and workings of the communication system 1 according to the present embodiment.

(General Operation Outline)

First, a general operation outline of the communication system 1 is described with reference to FIGS. 1, 4 and 7. The clock generator 11 of the transmission device 10 generates the clock signal TxCK. The processor 12 performs predetermined processing to generate the transition signals TxF0 to TxF6, TxR0 to TxR6, and TxP0 to TxP6. in the transmitter 20 (FIG, 4), the serializer 21F generates the transition signal TxF9 on the basis of the transition signals TxF0 to TxF6 and the clock signal TxCK, the serializer 21R generates the transition signal TxR9 on the basis of the transition signal TxR0 to TxR6 and the clock signal TxCK, and the serializer 21P generates the transition signal TxP9 on the basis of the transition signal TxP0 to TxP6 and the clock signal TxCK. The transmission symbol generator 22 generates the symbol signals Txl1, Tx2, and Tx3 on the basis of the transition signals TxF9, TxR9, and TxP9 and the clock signal TxCK. The transition detector 25 generates the pre-emphasis control signals MUP and MDN on the basis of the transition signals TxF9, TxR9, and TxP9 and the symbol signals D1, D2, and D3.

In the output unit 26 (FIG. 7), the driver controller 27 generates the signals PUA, PDA, PUB, PDB, PUC, and PDC on the basis of the symbol signals Tx1, Tx2, and Tx3 and the clock signal TxCK. On the basis of the pre-emphasis control signals MUP and MDN and the clock signal TxCK, the timing controller 27T performs timing adjustment on the pre-emphasis control signal MUP to generate the pre-emphasis control signal MUP2, and performs timing adjustment on the pre-emphasis control signal MDN to generate the pre-emphasis control signal MDN2. The pre-emphasis controller 28A generates the signals PUA1 to PUA24 and PDA1 to PDA24 on the basis of the signals PUA and PDA and the pre-emphasis control signals MUP2 and MDN2. The pre-emphasis controller 28B generates the signals PUB1 to PUB24 and PDB1 to PDB24 on the basis of the signals PUB and PDB and the pre-emphasis control signals MUP2 and MDN2. The pre-emphasis controller 28C generates the signals PUC1 to PUC24 and PDC1 to PDC24 on the basis of the signals PUC and PDC and the pre-emphasis control signals MUP2 and MDN2. The driver unit 29A generates the signal SIGA on the basis of the signals PUA1 to PUA24 and PDA1 to PDA24. The driver unit 29B generates the signal SIGB on the basis of the signals PUB1 to PUB24 and PDB1 to PDB24. The driver unit 29C generates the signal SAW on the basis of the signals PUC1 to PUC24 and PDC1 to PDC24.

In the reception device 30 (FIG. 1), the receiver 40 receives the signals SIGA, SIGB, and SIGC, and generates the transition signals RxF, RxR, and RxP and the clock signal RxCK on the basis of the signals SIGA, SIGB, and SIGC. The processor 32 performs predetermined processing on the basis of the transition signals RxF, RxR, and RxP and the clock signal RxCK.

(Specific Operation)

Next, the operation of the transmission device 10 is described in detail below. In the transmission device 10, the transition detector 25 generates the pre-emphasis control signals MUP and MDN on the basis of the transition signals TxF9, TxR9, and TxP9 and the symbol signals D1, D2, and D3. Specifically, the transition detector 25 confirms, on the basis of the transition signals TxF9, TxR9, and TxP9 and the symbol signals D1, D2, and D3, whether or not the symbol transition is the symbol transition having the possibility that the transition time of any of the differences AB, BC, and CA becomes long, and generates the pre-emphasis control signal MVP and MDN on the basis of a thus-obtained result.

FIG. 12 schematically illustrates eye diagrams of the differences AB, BC, and CA in a case where the transmission device 10 does not perform pre-emphasis. As illustrated in FIG. 12, transitions W21 and W22 have a longer transition time than other transitions. The transition W21 is a transition from −2ΔV to +ΔV, and the transition W22 is a transition from +2ΔV to −ΔV.

The transition detector 25 confirms, on the basis of the transition signals TxF9, TxR9, and TxP9 and the symbol signals D1, D2, and D3, whether or not the symbol transition is the symbol transition, such as the transitions W21 and W22, having the possibility that the transition time of any of the differences AB, BC, and CA becomes long. Thereafter, as illustrated in FIG. 5, in a case where the transition signals TxF9, TxR9, and TxP9 are "000" or "010", the transition detector 25 determines that the symbol transition is the symbol transition having the possibility that the transition time of any of the differences AB, BC, and CA becomes long. Thereafter, as illustrated by WUP circled by the solid line in FIG. 5, in a case where the transition signals TxF9, TxR9, and TxP9 are "000" and the symbol DS indicated by the symbol signals D1, D2, and D3 is "+x", "+y", and "+z", and in a case where the transition signals TxF9, TxR9, and TxP9 are "010" and the symbol DS indicated by the symbol signals D1, D2, and D3 is "−x", "−y", and "−z", the transition detector 25 sets the pre-emphasis control signal MVP to "1" (active). Moreover, as illustrated by WDN circled by the broken line in FIG. 5, in a case where the transition signals TxF9, TxR9, and TxP9 are "000" and the symbol DS indicated by the symbol signals D1, D2, and D3 is "−x", "−y" and "−z", and in a case where the transition signals TxF9, TxR9, and TxP9 are "010" and the symbol DS indicated by the symbol signals D1, D2, and D3 is "+x", "+y", and "+z", the transition detector 25 sets the pre-emphasis control signal MDN to "1" (active).

Then, the pre-emphasis controller 28A sets the voltage of the signal SIGA to the medium-level voltage VMplus that is slightly higher than the medium-level voltage VM in a case where the pre-emphasis control signal MUP2 is "1", and sets the voltage of the signal SIGA to the medium-level voltage VMminus that is slightly lower than the medium-level voltage VM in a case where the pre-emphasis control signal MDN2 is "1". Likewise, the pre-emphasis controller 28B sets the voltage of the signal SIGB to the medium-level voltage VMplus that is slightly higher than the medium-level voltage VM in the case where the pre-emphasis control signal MUP2 is "1", and sets the voltage of the signal SIGB to the medium-level voltage VMminus that is slightly lower than the medium-level voltage VM in the case where the pre-emphasis control signal MDN2 is "1". The pre-emphasis controller 28C sets the voltage of the signal SIGC to the medium-level voltage VMplus that is slightly higher than the medium-level voltage VM in the case where the pre-emphasis control signal MUP2 is "1", and sets the voltage of the signal SIGC to the medium-level voltage VMminus that is slightly lower than the medium-level voltage VM in the case where the pre-emphasis control signal MDN2 is "1".

FIGS. 13A to 13E illustrate an operation example of the communication system 1 in a case where the symbol transits from "+x" to a symbol other than "−x". FIG. 13A illustrates a case where the symbol transits from "+x" to "−x", FIG. 13B illustrates a case where the symbol transits from "+x" to "+y", FIG. 13C illustrates a case where the symbol transits from "+x" to "−y", FIG. 13D illustrates a case where the symbol transits from "+x" to "+z", and FIG. 13E illustrates a case where the symbol transits from "+x" to "−z". In each of FIGS. 13A to 13E, (A) indicates waveforms of the signals SIGA, SIGB, and SIGC at the output terminals ToutA, ToutB, and ToutC of the transmission device 10, and (B) indicates waveforms of the differences AB, BC, and CA in the reception device 30. Moreover, a solid line indicates a waveform in a case where the pre-emphasis operation is performed, and a broken line indicates a waveform in a case where the pre-emphasis operation is not performed.

As illustrated in FIG. 5, in a case where the symbol DS is "+x" and the transition signals TxF9, TxR9, and TxP9 are "1xx", the symbol transits from "+x" to "−x" (FIG. 13A). At this time, the transition detector 25 sets both the pre-emphasis control signal MUP and MDN to "0" (inactive), as illustrated in FIG. 5. Accordingly, as illustrated in FIG. 13A, the signal SIGA changes from the high-level voltage VH to the low-level voltage VL, the signal SIGB changes from the low-level voltage VL to the high-level voltage VH, and the signal SIGC maintains the medium-level voltage VM. In other words, in a case where the symbol transits from "+x" to "−x", none of transitions of the differences AB, BC, and CA corresponds to the transitions W21 and W22; therefore, the pre-emphasis controller 28C controls the driver unit 29C not to perform the pre-emphasis operation.

Moreover, in a case where the symbol DS is "+x" and the transition signals TxF9, TxR9, and TxP9 are "010", the symbol transits from "+x" to "+y" (FIG. 13B). At this time, the transition detector 25 respectively sets the pre-emphasis control signal MDN and the pre-emphasis control signal MUP to "1" (active) and "0" (inactive), as illustrated in FIG. 5. Accordingly, as illustrated in FIG. 13B, the signal SIGA changes from the high-level voltage VH to the medium-level voltage VM through the medium-level voltage VMminus, the signal SIGB changes from the low-level voltage VL to the high-level voltage VH, and the signal SIGC changes from the medium-level voltage VM to the low-level voltage VL. At this time, the pre-emphasis controller 28A controls the driver unit 29A to set the voltage of the signal SIGA to the medium-level voltage VMminus that is slightly lower than the medium-level voltage VM in a first half time period (0.5 UI) of a time period in which the transmission device 10 outputs the symbol "+y". In other words, the transition of the difference AB corresponds to the transition W22, and has a possibility that the transition time of the difference AB becomes long; therefore, the pre-emphasis controller 28A controls the driver unit 29A to perform the pre-emphasis operation.

Further, in a case where the symbol DS is "+x" and the transition signals TxF9, TxR9, and TxP9 are "011", the symbol transits from "+x" to "−y" (FIG. 13C). At this time, the transition detector 25 sets both the pre-emphasis control signals MUP and MDN to "0" (inactive), as illustrated in FIG. 5. Accordingly, as illustrated in FIG. 13C, the signal SIGA changes from the high-level voltage VH to the medium-level voltage VM, the signal SIGB maintains the low-level voltage VL, and the signal SIGC changes from the medium-level voltage VM to the high-level voltage VH. In other words, in a case where the symbol transits from "+x" to "−y", none of the transitions of the differences AB, BC, and CA corresponds to the transitions W21 and W22; therefore, the pre-emphasis controller 28A controls the driver unit 29A not to perform the pre-emphasis operation.

Furthermore, in a case where the symbol DS is "+x" and the transition signals TxF9, TxR9, and TxP9 are "000", the symbol transits from "±x" to "+z" (FIG. 13D). At this time, the transition detector 25 respectively sets the pre-emphasis control signal MUP and the pre-emphasis control signal MDN to "1" (active) and "0" (inactive), as illustrated in FIG. 5. Accordingly, as illustrated in FIG. 13D, the signal SIGA changes from the high-level voltage VH to the low-level voltage VL, the signal SIGB changes from the low-level voltage VL to the medium-level voltage VM through the medium-level voltage VMplus, and the signal SIGC changes from the medium-level voltage VM to the high-level voltage VH. At this time, the pre-emphasis controller 28B controls the driver unit 29B to set the voltage of the signal SIGB to the medium-level voltage VMplus that is slightly higher than the medium-level voltage VM in a first half time period (0.5 UI) of a time period in which the transmission device 10 outputs the symbol "+z". In other words, the transition of the difference AB corresponds to the transition W22, and has a possibility that the transition time of the difference AB becomes long; therefore, the pre-emphasis controller 28B controls the driver unit 29B to perform the pre-emphasis operation.

Moreover, in a case where the symbol DS is "+x" and the transition signals TxF9, TxR9, and TxP9 are "001", the symbol transits from "+x" to "−z" (FIG. 13E). At this time, the transition detector 25 sets both the pre-emphasis control signals MUP and MDN to "0" (inactive), as illustrated in FIG. 5. Accordingly, as illustrated in FIG. 13E, the signal SIGA maintains the high-level voltage VH, the signal SIGB changes from the low-level voltage VL to the medium-level voltage VM, and the signal SIGC changes from the medium-level voltage VM to the low-level voltage VL. In other words, in a case where the symbol transits from "+x" to "−z", none of the transitions of the differences AB, BC, and CA corresponds to the transitions W21 and W22, therefore, the pre-emphasis controller 28B controls the driver unit 29B not to perform the pre-emphasis operation.

It is to be noted that the case where the symbol transits from "+x" to a symbol other than "+x" is described in this example; however, this also applies a case where the symbol transits from "−x" to a symbol other than "−x", a case where the symbol transits from "+y" to a symbol other than "+y", a case where the symbol transits from "−y" to a symbol other than "−y", a case where the symbol transits from "+z" to a symbol other than "+z", and a case where the symbol transits from "−z" to a symbol other than "−z".

As described above, in the communication system 1, for example, in a case where the symbol transition is a symbol transition having the possibility that the transition time of any of the differences AB, BC, and CA becomes long upon changing the signal SIGA from the voltage state SH or the voltage state SL to the voltage state SM, the driver unit 29A performs the pre-emphasis operation. This makes it possible to enhance waveform quality in the communication system 1, for example, in a case where the transmission path 100 is long. In particular, in the transmission device 10, even in a case where the medium-level voltages VMplus and VMminus are outputted, the output impedances of the driver units 29A, 29B, and 29C become about 50[Ω], which makes it possible to enhance waveform quality. As a result, it is possible to enhance communication performance in the communication system 1.

Moreover, in the communication system 1, the transition detector 25 detects a specific symbol transition on the basis of the transition signals TxF9, TxR9, and TxP9, and the pre-emphasis controllers 28A, 28B, and 28C cause the driver units 29A, 29B, and 29C to perform the pre-emphasis operation on the basis of a thus-obtained detection result. This makes it possible to actively perform the pre-emphasis operation on, for example, only the symbol transition having a possibility that waveform quality is deteriorated in the communication system 1, which makes it possible to effectively enhance waveform quality.

FIGS. 14A to 14D illustrate eye diagrams of the difference AB between the signal SIGA and the signal SIGB, the difference BC between the signal SIGB and the signal SIGC, and the difference CA between the signal SIGC and the signal SIGA in the communication system 1. In a case where the voltage state at the output terminal ToutA is set to the voltage state SM, the driver unit 29A turns on, for example, (10+m) transistors 91 and (10−m) transistor 94 to set the signal SIGA to the medium-level voltage VMplus, and turns on (10−m) transistors 91 and (10+m) transistors 94 to set the signal SIGA to the medium-level voltage VMminus. FIG. 14A illustrates a case of "m=0", FIG. 14B illustrates a case of "m=1", FIG. 14C illustrates a case of "m=2", and FIG. 14D illustrates a case of "m=3". "m=0" indicates that the pre-emphasis operation is not performed. With an increase in the value of "m", the medium-level voltage VMplus becomes higher and the medium-level voltage VMminus becomes lower. In other words, a deviation amount (a boost amount) of the medium-level voltage VM by the pre-emphasis operation becomes larger with an increase in the value of "m". Accordingly, it is possible to widen an eye opening with an increase in the value of "m", as illustrated in FIGS. 14A to 14D. As described above, in the communication system 1, performing the pre-emphasis operation makes it possible to widen the eye opening, and as a result, it is possible to enhance communication performance.

(Comparative Example)

Next, workings of the present embodiment are described as compared with a comparative example. A communication system 1R according to the comparative example includes a transmission device 10R. The transmission device 10R includes two driver units 29RA that both are coupled to the output terminal ToutA, two driver units 29RB that both are coupled to the output terminal ToutB, and two driver units 29RC that both are coupled to the output terminal ToutC. For example, the transmission device 10R causes the two driver unit 29RA to operate together, thereby causing the output impedance to become about 25[Ω], causes the two driver units 29RB to operate together, thereby causing the output impedance to become about 25[Ω], and causes the two driver unit 29RC to operate together, thereby causing the output impedance to become about 25[Ω]. The transmission device 10R reduces the output impedance in such a manner to perform the pre-emphasis operation.

FIGS. 15A to 15E illustrate an operation example of the communication system 1R in a case where the symbol transits from "+x" to a symbol other than "'x". For example, as illustrated in FIG. 15A, in a case where the symbol transits from "+x" to "+x", the signal SIGA changes from the high-level voltage VH to the low-level voltage VL through a voltage lower than the low-level voltage VL, the signal SIGB changes from the low-level voltage VL to the high-level voltage VH through a voltage higher than the high-level voltage VH, and the signal SIGC maintains the medium-level voltage VM. At this time, in a first half time period (0.5 UI) of a time period in which the transmission device 10R outputs the symbol "−x", both the two driver units 29RA operate to cause the output impedance to become about 25[Ω], both the two driver units 29RB operate to cause the output impedance to become about 25[Ω], and both the two driver units 29RC operate to cause the output impedance to become about 25[Ω]. This also applies other symbol transitions.

As described above, in the communication system 1R according to the comparative example, the output impedance is set to about 25[Ω] to perform the pre-emphasis operation, which causes a time period in which the output impedance does not match a characteristic impedance of the transmission path 100. Accordingly, in the communication system 1R, there is a possibility that waveform quality is deteriorated to deteriorate communication performance. Moreover, in the communication system 1R, the output impedance transiently becomes about 25[Ω] upon outputting the median-level voltage VM, which increases a DC current by Thevenin termination, and as a result, power consumption related to the CD current is increased by about 67%, for example. Further, in the communication system 1R, the two driver units 29RA, the two driver units 29RB, and the two driver units 29RC are provided, which increases a circuit area.

In contrast, in the communication system 1 according to the present embodiment, the numbers of the transistors 91 and 94 to be turned on are changed to perform the pre-emphasis operation, which makes it possible to maintain the output impedance at about 50[Ω]. As a result, the output impedance matches the characteristic impedance of the transmission path 100, which makes it possible to enhance waveform quality and enhance communication performance. Moreover, in the communication system 1, as compared with the communication system 1R according to the comparative example, it is possible to reduce the DC current by Thevenin termination, which makes it possible to reduce power consumption. Further, in the communication system 1, one driver unit 29A, one driver unit 29B, and one driver unit 29C are provided, which makes it possible to reduce a circuit area, as compared with the communication system 1R according to the comparative example.

[Effects]

As described above, in the present embodiment, in the case where the symbol transition is the symbol transition having the possibility that the transition time of any of the differences AB, BC, and CA becomes long, the driver unit that outputs the medium-level voltage after the transition performs the pre-emphasis operation. In particular, even in a case where the medium-level voltage VMplus and VMminus are outputted, the output impedance becomes about 50[Ω], which makes it possible to enhance communication performance and reduce power consumption.

In the present embodiment, the transition detector detects a specific symbol transition on the basis of the transition signal, and the pre-emphasis controller causes the driver unit to perform the pre-emphasis operation on the basis of a thus-obtained detection result, which makes it possible to effectively enhance communication performance.

[Modification Example 1-1]

In the foregoing embodiment, twenty transistors 91 are turned on to generate the high-level voltage VH; however, the embodiment is not limited thereto. For example, in a case where the sum of the resistance value of on resistance of the transistor 91 and the resistance value of the resistor 92 is smaller than 1000[Ω] by device variations in manufacturing, the number of the transistors 91 to be turned on may be reduced. Moreover, in a case where the sum of the resistance value of on resistance of the transistor 91 and the resistance value of the resistor 92 is larger than 1000[Ω], the number of the transistors 91 to be turned on may be increased. This also applies to a case where the low-level voltage VL is generated.

[Modification Example 1-2]

In the foregoing embodiment, ten transistors 91 and ten transistors 94 are turned on to generate the medium-level voltage VM; however, the embodiment is not limited thereto. For example, in a case where the sum of the resistance value of on resistance of the transistor 91 and the resistance value of the resistor 92 is smaller than the sum of the resistance value of on resistance of the transistor 94 and the resistance value of the resistor 93 by device variations in manufacturing, a number M1 of the transistors 91 to be turned on may be smaller than a number M2 of the transistors 94 to be turned on. Moreover, in a case where the sum of the resistance value of on resistance of the transistor 91 and the resistance value of the resistor 92 is larger than the sum of the resistance value of on resistance of the transistor 94 and the resistance value of the resistor 93, the number M1 of the transistors 91 to be turned on may be larger than the number M2 of the transistors 94 to be turned on. This makes it possible to bring the medium-level voltage VM close to a medium voltage interposed between the high-level voltage VH and the low-level voltage VL.

Likewise, in the foregoing embodiment, (10+m) transistors 91 and (10−m) transistors 94 are turned on to generate the medium-level voltage VMplus, and (10−m) transistors 91 and (10+m) transistors 94 are turned on to generate the medium-level voltage VMminus; however, the embodiment is not limited thereto. Alternatively, for example, (M1+m1) transistors 91 and (M2−m2) transistors 94 may be turned on to generate the medium-level voltage VMplus, and (M1−m1) transistors 91 and (M2+m2) transistors 94 may be turned on to generate the medium-level voltage VMminus.

[Modification Example 1-3]

In the foregoing embodiment, the pre-emphasis control signals MUP2 and MDN2 are changeable from the low level to the high level at the start timing of the unit interval UI, and are changeable from the high level to the low level at a timing after a lapse of a half time period (0.5 UI) of the unit interval UI from the start timing of the unit interval UI, as illustrated in FIG. 8; however, the embodiment is not limited thereto. Alternatively, for example, the pre-emphasis control signals MUP2 and MDN2 may be changeable from the low level to the high level at the start timing of the unit interval UI, and may be changeable from the high level to the low level at a timing after a lapse of a time period shorter than a half of the unit interval UI from the start timing of the unit interval UI. Moreover, for example, the pre-emphasis control signals MUP2 and MDN2 may be changeable from the low level to the high level at the start timing of the unit interval UI, and may be changeable from the high level to the low level at a timing after a lapse of a time period longer than the half of the unit interval UI from the start timing of the unit interval UI.

[Modification Example 1-4]

In the foregoing embodiment, the numbers of the transistors 91 and 94 are changed to generate the medium-level voltages VMplus and VMminus however, the embodiment is not limited thereto. The present modification example is described in detail below.

FIG. 16 illustrates a configuration example of an output unit 26A according to the present modification example. The output unit 26 includes the driver controller 27, the timing controller 27T, impedance controllers 18A, 18B, and 18C, an operational amplifier 14, a capacitor 15, and driver units 19A, 19B, and 19C.

The impedance controller 18A generates signals PUA1 to PUA24, PDA1 to PDA24, and PMA on the basis of the signal PUA and PDA. Specifically, in a case where the signal PUA is "1" and the signal PDA is "0", the impedance controller 18A sets twenty of the signals PUA1 to PUA24 to "1" and sets the remaining four of the signals PUA1 to PUA24, the signals PDA1 to PDA24, and the signal PMA to "0". Moreover, in a case where the signal PDA is "1" and the signal PUA is "0", the impedance controller 18A sets twenty of the signals PDA1 to PDA24 to "1", and sets the remaining four of the signals PDA1 to PDA24, the signals PUA1 to PUA24, and the signal PMA to "0". Further, in a case where both the signals PUA and PDA are "0", the impedance controller 18A sets the signal PMA to "1", and sets the signal PUA1 to PUA24 and PDA1 to PDA24 to "0".

Likewise, the impedance controller 183 generates signals PUB1 to PUB24, PDB1 to PDB24, and PMB on the basis of the signals PUB and PDB. Moreover, the impedance controller 18C generates signals PUC1 to PUC24, PDC1 to PDC24, and PMC on the basis of the signals PUC and PDC.

A positive input terminal of the operational amplifier 14 is supplied with the medium-level voltage VM, and a negative input terminal thereof is coupled to an output terminal thereof. With this configuration, the operational amplifier 14 operates as a voltage follower, and outputs the medium-level voltage VM to supply the medium-level voltage VM to the driver units 19A, 19B, and 19C. One end of the capacitor 15 is coupled to the output terminal of the operational amplifier 14, and the other end thereof is grounded.

The driver unit 19A generates the signal SIGA on the basis of the signals PUA1 to PUA24, PDA1 to PDA24, and PMA and the pre-emphasis control signals MUP2 and MDN2. The driver unit 19B generates the signal SIGB on the basis of the signals PUB1 to PUB24, PDB1 to PDB24, and PMB and the pre-emphasis control signals MUP2 and MDN2. The driver unit 19C generates the signal SIGC on the basis of the signals PUC1 to PUC24, PDC1 to PDC24, and PMC and the pre-emphasis control signals MUP2 and MDN2.

FIG. 17 illustrates a configuration of the driver unit 19A. It is to be noted that this also applies to the driver units 19B and 19C. The driver unit 19A includes the drivers 29A1 to 29A24 and a driver 16A. The driver 16A includes current sources 101 and 104, transistors 102, 103, and 106, and a resistor 105. One end of the current source 101 is supplied with the age V1, the other end thereof is coupled to a drain of the transistor 102. One end of the current source 104 is coupled to a source of the transistor 103, and the other end thereof is grounded. The transistors 102 and 103 in this example are N-channel MOS-FETs. A gate of the transistor 102 is supplied with the pre-emphasis control signal MUP2, the drain thereof is coupled to the other end of the current source 101, and a source thereof is coupled to a drain of the transistor 103, the other end of the resistor 105, and a source of the transistor 106. A gate of the transistor 103 is supplied with the pre-emphasis control signal MDN2, the source thereof is coupled to the one end of the current source 104, and the drain thereof is coupled to the source of the transistor 102, the other end of the resistor 105, and the source of the transistor 106. The resistor 105 serve as an output termination resistor in a case where the signal SIGA is set to the voltage state SM, and a resistance value thereof is about 50[Ω]. One end of the resistor 105 is supplied with the medium-level voltage VM by the operational amplifier 14, and the other end thereof is coupled to the sources of the transistors 102 and 106 and the drain of the transistor 103. The transistor 106 in this example is an N-channel MOS-FET. A gate of the transistor 106 is supplied with the signal PMA, the source thereof is coupled to the source of the transistor 102, the drain of the transistor 103, and the other end of the resistor 105, and a drain thereof is coupled to the output terminal ToutA.

Herein, the operational amplifier 14, the capacitor 15, and the driver 16A correspond to specific examples of a "third circuit" in the present disclosure.

With this configuration, for example, in a case where the voltage of the signal SIGA is set to the high-level voltage VH (the voltage state SH), in the driver unit 19A, twenty of the twenty four transistors 91 are turned on, and the remaining four of the twenty four transistors 91, the twenty four transistors 94, and the transistor 106 are turned off. As a result, the signal SIGA is set to the high-level voltage VH, and the output termination resistance (output impedance) of the driver unit 19A becomes about 50[Ω](=1000/20). Moreover, in a case where the voltage of the signal SIGA is set to the low-level voltage VL (the voltage state SL), in the driver unit 19A, twenty of the twenty four transistors 94 are turned on, and the remaining four of the twenty four transistors 94, the twenty four transistors 91, and the transistor 106 are turned off. As a result, the signal SIGA is set to the low-level voltage VL, and the output termination resistance (output impedance) of the driver unit 19A becomes about 50[Ω].

Further, in a case where the voltage state at the output terminal ToutA is set to the voltage state SM, in the driver unit 19A, the transistor 106 is turned on, and the twenty four transistors 91 and the twenty four transistors 94 are turned off. At this time, in a case where both the pre-emphasis control signals MUP2 and MDN2 are "0", the transistors 102 and 103 are turned off. Accordingly, the signal SIGA is set to the medium-level voltage VM, and the output termination resistance (output impedance) of the driver unit 29A becomes about 50[Ω]. Furthermore, in a case where pre-emphasis control signal MUP2 is "1" and the pre-emphasis control signal MDN2 is "0", the transistor 102 is turned on, and the transistor 103 is turned off. Accordingly, a current passes through the current source 101, the transistor 102, and the resistor 105 in this order, and as a result, the signal SIGA is set to the medium-level voltage VMplus that is slightly higher than the medium-level voltage VM. At this time, the output termination resistance (output impedance) of the driver unit 29A is about 50[Ω]. Moreover, in a case where the pre-emphasis control signal MDN2 is "1" and the pre-emphasis control signal MUP2 is "0", the transistor 103 is turned on, and the transistor 102 is turned off. Accordingly, a current passes through the resistor 105, the transistor 103, and the current source 104 in this order, and as a result, the signal SIGA is set to the medium-level voltage VMminus that is slightly lower than the medium-level voltage VM. At this time, the output termination resistance (output impedance) of the driver unit 29A is about 50[Ω].

Even such a configuration makes it possible to achieve effects similar to those in the foregoing embodiment.

[Other Modification Example]

Moreover, two or more of these modification examples may be combined.

<2. Second Embodiment>

Next, description is given of a communication system 2 according to a second embodiment. In the present embodiment, a driver unit that outputs the high-level voltage VH or the low-level voltage VL after the transition also performs the pre-emphasis operation. It is to be noted that components substantially same as those of the communication system 1 according to the foregoing first embodiment are denoted by the same reference numerals, and description of such components is appropriately omitted.

The communication system 2 includes a transmission device 50, as illustrated in FIG. 1. The transmission device 50 includes a transmitter 60. The transmitter 60 includes an output unit 66, as illustrated in FIG. 4.

FIG. 18 illustrates a configuration example of the output unit 66. The output unit 66 includes the driver controller 27, the timing controller 27T, pre-emphasis controllers 68A, 68B, and 68C, and driver units 69A, 69B, and 69C.

The pre-emphasis controller 68A generates eight signals PUAA0, PUAB0, PUAA1, PUAB1, PDAA0, PDAB1, PDAA1, and PDAB1 on the basis of the signals PUA and PDA and the pre-emphasis control signals MUP2 and MDN2. The driver unit 69A generates the signal SIGA on the basis of the eight signals PUBA0, PUAB0, PUAA1, PUAB1, PDAA0, PDAB0, PDAA1, and PDAB1.

The pre-emphasis controller 68B generates eight signals PUBA0, PUBB0, PUBA1, PUBB1, PDBA0, PDAB0, PDBA1, and PDBB1 on the basis of the signals PUB and PDB and the pre-emphasis control signals MUP2 and MDN2. The driver unit 69B generates the signal SIGB on the basis of the eight signals PUBB0, PUBB0, PUBA1, PUBB1, PDBA0, PUBB0, PDBA1, and PDBB1.

The pre-emphasis controller 68C generates eight signals PUCB0, PUCB0, PUCA1, PUCB1, PDCA0, PDCB0, PDCA1, and PDCB1 on the basis of the signals PUC and PDC and the pre-emphasis control signals MUP2 and MDN2. The driver unit 69C generates the signal SIGC on the basis of the eight signals PUCA0, PUCB0, PUCA1, PUCB1, PDCA0, PDCB0, PDCA1, and PDCB1.

FIG. 19 illustrates a configuration example of the driver unit 69A. It is to be noted that this also applies to the driver units 19B and 19C, The driver unit 69A includes M circuits UA0 (circuits $UA0_1$ to $UA0_M$), N circuits UB0 (circuits $UB0_1$ to $UB0_N$), M circuits UA1 (circuits $UA1_1$ to $UA1_M$), N circuits UB1 (circuits $UB1_1$ to $UB1_N$), M circuits DA0 (circuits $DA0_1$ to $DA0_M$), N circuits DB0 (circuits $DB0_1$ to $DB0_N$), M circuits DA1 (circuits $DA1_1$ to $DA1_M$), and N circuits DB1 (circuits $DB1_1$ to $DB1_N$). Herein, "M" is a number larger than "N".

Each of the circuits $UA0_1$ to $UA0_M$, $UB0_1$ to $UB0_N$, $UA1_1$ to $UA1_M$, and $UB1_1$ to $UB1_N$ includes the transistor 91 and the resistor 92. A gate of the transistor 91 in each of the circuits $UA0_1$ to $UA0_M$ is supplied with the signal PUAA0. A gate of the transistor 91 in each of the circuits $UB0_1$ to $UB0_N$ is supplied with the signal PUAB0. A gate of the transistor 91 in each of the circuits $UA1_1$ to $UA1_M$ is supplied with the signal PUAA1. A gate of the transistor 91 in each of the circuits $UB1_1$ to $UB1_N$ is supplied with the signal PUAB1.

Each of the circuits $DA0_1$ to $DA0_M$, $DB0_1$ to $DB0_N$, $DA1_1$ to $DA1_M$, $DB1_1$ to $DB1_N$ includes the resistor 93 and the transistor 94. A gate of the transistor 94 in each of the circuits $DA0_1$ to $DA0_M$ is supplied with the signal PDAA0. A gate of the transistor 94 in each of the circuits $DB0_1$ to $DB0_N$ is supplied with the signal PDAB0. A gate of the transistor 94 in each of the circuits $DA1_1$ to $DA1_M$ is supplied with the signal PDAA1. A gate of the transistor 94 in each of the circuits $DB1_1$ to $DB1_N$ is supplied with the signal PDAB1.

FIG. 20 illustrates an operation example of the pre-emphasis controller 68A and the driver unit 69A. It is to be noted that this also applies to the pre-emphasis controller 68B and the driver unit 69B, and also applies to the pre-emphasis controller 68C and the driver unit 69C. Herein, it is indicated that "X" may be either "0" or "1".

For example, in a case where the signals PUA and PDA are "10" and the pre-emphasis control signals MUP2 and MDN2 are "0X", the pre-emphasis controller 68A sets the signals PUAA0, PUAB0, PDAA1, PUAB1, PDAA0, PDAB0, PDAA1, and PDAB1 to "11110000". Accordingly, in the driver unit 69A, the transistors 91 in the circuits $UA0_1$ to $UA0_M$, $UB0_1$ to $UB0_N$, $UA1_1$ to $UA1_M$, and $UB1_1$ to $UB1_N$ are turned on. As a res the signal SIGA is set to the high-level voltage VH, and the output termination resistance (output impedance) of the driver unit 69A becomes about 50[Ω].

Moreover, for example, in a case where the signals PUA and PDA are "10" and the pre-emphasis control signals MUP2 and MDN2 are "10", the pre-emphasis controller 68A sets to the signals PDAA1, PUAB1, PUAA1, PUAB1, PDAA1, PDAB0, PDAA1, and PDAB1 to "10110001". Accordingly, in the driver unit 69A, the transistors 91 in the circuits $UA0_1$ to $UA0_M$, $UA1_1$ to $UA1_M$, and $UB1_1$ to $UB1_N$ are turned on, and the transistors 94 in the circuits $DB1_1$ to $DB1_N$ are turned on. As a result, the signal SIGA is set to a high-level voltage VHminus that is slightly lower than the high-level voltage VH, and the output termination resistance (output impedance) of the driver unit 69A becomes about 50[Ω].

Further, for example, in a case where the signals PUA and PDA are "11" and the pre-emphasis control signals MUP2 and MDN2 are "10", the pre-emphasis controller 68A sets the signals PUAA0, PUAB0, PUAA1, PUAB1, PDAA0, PDAB0, PDAA1, and PDAB1 to "11011000". Accordingly, in the driver unit 69A, the transistors 91 in the circuits $UA0_1$ to $UA0_M$, $UB0_1$ to $UB0_N$, and $UB1_1$ to $UB1_N$ are turned on, and the transistor 94 in the circuits $DA0_1$ to $DA0_M$ are turned on. As a result, the signal SIGA is set to the medium-level voltage VMplus that is slightly higher than the medium-level voltage VM, and the output termination resistance (output impedance) of the driver unit 69A becomes about 50[Ω].

Furthermore, for example, in a case where the signals PUA and PDA are "11" and the pre-emphasis control signals MUP2 and MDN2 are "00", the pre-emphasis controller 68A sets the signals PUAA0, PUAB0, PUAA1, PDAB1, PDAA0, PDAB0, PDAA1, and PDAB1 to "11001100". Accordingly, in the driver unit 69A, the transistors 91 in the circuits $UA0_1$ to $UA0_M$ and $UB0_1$ to $UB0_N$ are turned on, and the transistors 94 in the circuits $DA0_1$ to $DA0_M$ and $DB0_1$ to $DB0_N$ are turned on. As a result, the signal SIGA is set to the medium-level voltage VM, and the output termination resistance (output impedance) of the driver unit 69A becomes about 50[Ω].

Moreover, for example, in a case where the signals PUA and PDA are "11" and the pre-emphasis control signals MUP2 and MDN2 are "01", the pre-emphasis controller 68A sets the signals PUAA0, PUAB0, PUAA1, PDAB1, PDAA0, PDAB0, PDAA1 and PDAB1 to "10001101". Accordingly, in the driver unit 69A, the transistors 91 in the circuits $UA0_1$ to $UA0_M$ are turned on, and the transistor 94 in the circuits $DA0_1$ to $DA0_M$, $DB0_1$ to $DB0_N$, and $DB1_1$ to $DB1_N$ are turned on. As a result, the signal SIGA is set to the medium-level voltage VMminus that is slightly lower than the medium-level voltage VM, and the output termination resistance (output impedance) of the driver unit 69A becomes about 50[Ω].

Further, for example, in a case where the signals PUA and PDA are "01" and the pre-emphasis control signals MUP2 and MDN2 are "01", the pre-emphasis controller 684 sets the signals PUAA0, PUAB0, PUAA1, PUAB1, PDAA0, PDAB0, PDAA1, and PDAB1 to "01001110". Accordingly, in the driver unit 69A, the transistors 91 in the circuits $UB0_1$ to $UB0_N$ are turned on, and the transistor 94 in the circuits $DA0_1$ to $DA0_M$, $DB0_1$ to $DB0_N$, and $DA1_1$ to $DA1_M$ are turned on. As a result, the signal SIGA is set to a low-level voltage VLplus that is slightly higher than the low-level voltage VL, and the output termination resistance (output impedance) of the driver unit 69A becomes about 50[Ω].

Furthermore, for example, in a case where the signals PUA and PDA are "01" and the pre-emphasis control signals MUP2 and MDN2 are "X0", the pre-emphasis controller 68A sets the signals PUAA0, PUAB0, PUAB1, PUAB1, PDAA0, PDAB0, PDAA1, and PUAB1 to "00001111". Accordingly, in the driver unit 69A, the transistors 94 in the circuits $DA0_1$ to $DA0_M$, $DB0_1$ to $DB0_N$, $DA1_1$ to $DA1_M$, and $DB1_1$ to $DB1_N$ are turned on. As a result, the signal SIGA is set to the low-level voltage VL, and the output termination resistance (output impedance) of the driver unit 69A becomes about 50[Ω].

Herein, the circuits $UA0_1$ to $UA0_M$, $UB0_1$ to $UB0_N$, $UA1_1$ to $UA1_M$, and $UB1_1$ to $UB1_N$ correspond to a specific example of a "plurality of first sub-circuits" in the present disclosure. The circuits $DA0_1$ to $DA0_M$, $DB0_1$ to $DB0_N$, $DA1_1$ to $DA1_M$, and $DB1_1$ to $DB1_N$ correspond to a specific example of a "plurality of second sub-circuits" in the present disclosure.

FIGS. 21A, 21B, and 21C illustrate an operation example of the driver unit 69A upon outputting the symbol "−z". FIG. 21A illustrates a case where the pre-emphasis control signals MUP2 and MDN2 are "00", FIG. 21B illustrates a case where the pre-emphasis control signals MUP2 and MDN2 are 10", and FIG. 21C illustrates a case where the pre-emphasis control signals MUP2 and MDN2 are "01". In FIGS. 21A, 219, and 21C, a circuit indicated by a solid line and a circuit indicated by a broken line of the circuits $UA0_1$ to $UA0_M$, $UB0_1$ to $UB0_N$, $UA1_1$, to $UA1_M$, and $UB1_1$ to $UB1_N$ respectively indicate a circuit in which the transistor 91 is turned on, and a circuit in which the transistor 91 is turned off. Likewise, a circuit indicated by a solid line and a circuit indicated by a broken line of the circuits $DA0_1$ to $DA0_M$, $DB0_1$ to $DB0_N$, $DA1_1$ to $DA1_M$, and $DB1_1$ to $DB1_N$ respectively indicate a circuit in which the transistor 94 is turned on, and a circuit in which the transistor 94 is turned off.

In the case where the pre-emphasis control signals MUP2 and MDN2 are "00", in the driver unit 69A, the transistors 91 in the M circuits UA0, the N circuits UB0, the M circuits UA1, and the N circuits UB1 are turned on, as illustrated in FIG. 21A. Moreover, in the driver unit 69B, the transistors 91 in the M circuits UA0 and the N circuits UB0 are turned on, and the transistors 94 in the M circuits DA0 and the N circuits DB0 are turned on. Further, in the driver unit 69C, the transistors 94 in the M circuits DA0, the N circuits DB0, the M circuits DA1, and the N circuits DB1 are turned on. Accordingly, the voltage of the signal SIGA is set to the high-level voltage VH, the voltage of the signal SIGB is set to the medium-level voltage VM, and the voltage of the signal SIGC is set to the low-level voltage VL.

In the case where the pre-emphasis control signals MUP2 and MDN2 are "10", in the driver unit 69A, the transistors 91 in the M circuits UA0, the M circuits UA1, and the N circuits UB1 are turned on, and the transistors 94 in the N circuits DB1 are turned on, as illustrated in FIG. 21B. Moreover, in the driver unit 69B, the transistor 91 in the M circuits UA0, the N circuits UB0, and the N circuits UB1 are turned on, and the transistors 94 in the M circuits DA0 are turned on. Further, in the driver unit 69C, the transistors 94 in the M circuits DA0, the N circuits DB0, the M circuits DA1, and the N circuits DB1 are turned on. Accordingly, the voltage of the signal SIGA is set to the high-level voltage VHminus that is slightly lower than the high-level voltage VH, the voltage of the signal SIGB is set to the medium-level voltage VMplus that is slightly higher than the medium-level voltage VM, and the voltage of the signal SIGC is set to the low-level voltage VL. In other words, the driver unit 69A turns off the transistors 91 in the N circuits UB0 and turns on the transistors 94 in the N circuits DB1 to decrease the voltage of the signal SIGA from the high-level voltage VH to the high-level voltage VHminus, as compared with the case in FIG. 21A. Moreover, the driver unit 69B turns on the transistors in the N circuits UB1. and turns off the transistors 94 in the N circuits DB0 to increase the voltage of the signal SIGB from the medium-level voltage VM to the medium-level voltage VMplus, as compared with the case in FIG. 21A.

In a case where the pre-emphasis control signals MUP2 and MDN2 are "01", in the driver unit 69A, the transistors 91 in the M circuits UA0, the N circuits UB0, the M circuits UA1, and the N circuits UB1 are turned on, as illustrated in FIG. 21C. Moreover, in the driver unit 69B, the transistors 91 in the M circuits UA0 are turned on, and the transistors 94 in the M circuits DA0, the N circuits DB, the N circuits DB1 are turned on. Further, in the driver unit 69C, the transistors 91 in the N circuits UB0 are turned on, and the transistors 94 in the M circuits DA0, the N circuits DB0, and the M circuits DA1 are turned on. Accordingly, the voltage of the signal SIGA is set to the high-level voltage VH, the voltage of the signal SIGB is set to the medium-level voltage VMminus that is slightly lower than the medium-level voltage VM, and the voltage of the signal SIGC is set to the low-level voltage VLplus that is slightly higher than the low-level voltage VL. In other words, the driver unit 69B turns off the transistors 91 in the N circuits UB0, and turns on the transistors 94 in the N circuits DB1 to decrease the voltage of the signal SIGB from the medium-level voltage VM to the medium-level voltage VMminus, as compared with the case in FIG. 21A. Moreover, the driver unit 69C turns on the transistors 91 in the N circuits UB0, and turns off the transistors 94 in the N circuits DB1 to increase the voltage of the signal SIGC from the low-level voltage VL to the low-level voltage VLplus, as compared with the case in FIG. 21A.

FIGS. 22A to 22E illustrate an operation example of the communication system 2 in a case where the symbol transits from "+x" to a symbol other than "+x".

As illustrated in FIG. 5, in a case where the symbol DS is "+x", and the transition signals TxF9, TxR9, and TxP9 are "1xx", the symbol transits from "+x" to "−x" (FIG. 22A). At this time, the transition detector 25 sets both the pre-emphasis control signals MUP and MDN to "0" (inactive), as illustrated in FIG. 5. Accordingly, as illustrated in FIG. 22A, the signal SIGA changes from the high-level voltage VH to the low-level voltage VL, the signal SIGB changes from the low-level voltage VL to the high-level voltage VH, and the signal SIGC maintains the medium-level voltage VM. In other words, in a case where the symbol transits from "+x" to "−x", none of transitions of the differences AB, BC, and CA corresponds to the transitions W21 and W22; therefore, the pre-emphasis controllers 68A, 68B, and 68C controls the driver units 69A, 69B, and 69C not to perform the pre-emphasis operation.

Moreover, in a case where the symbol DS is "+x" and the transition signals TxF9, TxR9, and TxP9 are "010", the symbol transits from "+x" to "+y" (FIG. 22B). At this time, as illustrated in FIG. 5, the transition detector 25 sets the pre-emphasis control signal MDN to "1" (active), and sets the pre-emphasis control signal MUP to "0" (inactive). Accordingly, as illustrated in FIG. 22B, the signal SIGA changes from the high-level voltage VH to the medium-level voltage VM through the medium-level voltage VMminus, the signal SIGB changes from the low-level voltage VL to the high-level voltage VH, and the signal SIGC changes from the medium-level voltage VM to the low-level voltage VL through the low-level voltage VLplus. At this time, the pre-emphasis controller 68A controls the driver unit 69A to set the voltage of the signal SIGA to the medium-level voltage VMnius that is slightly lower than the medium-level voltage VM in a first half time period (0.5 UI) of a time period in which the transmission device 50 outputs the symbol "+y". Likewise, the pre-emphasis controller 68C controls the driver unit 69C to set the voltage of the signal SIGC to the low-level voltage VLplus that is slightly higher than the low-level voltage VL in the first half time period (0.5 UI) of the time period in which the transmission device 50 outputs the symbol "+y". In other words, the transition of the difference AB corresponds to the transition W22, and has a possibility that the transition time of the difference AB becomes long; therefore, the pre-emphasis controllers 68A and 68C control the driver units 69A and 69C to perform the pre-emphasis operation.

Further, in a case where the symbol DS is "+x" and the transition signals TxF9, TxR9, and TxP9 are "011", the symbol transits from "+x" to "−y" (FIG. 22C).

At this time, the transition detector 25 sets both the pre-emphasis control signals MUP and MDN to "0" (inactive), as illustrated in FIG. 5. Accordingly, as illustrated in FIG. 22C, the signal SIGA changes from the high-level voltage VH to the medium-level voltage VM, the signal SIGB maintains the low-level voltage VL, and the signal SIGC changes from the medium-level voltage VM to the high-level voltage VH. In other words, in a case where the symbol transits from "+x" to "−y", none of the transitions of the differences AB, BC, and CA corresponds to the transitions W21 and W22; therefore, the pre-emphasis controllers 68A, 68B, and 68C controls the driver units 69A, 69B, and 69C not to perform the pre-emphasis operation.

Furthermore, in a case where the symbol DS is "+x" and the transition signals TxF9, TxR9, and TxP9 are "000", the symbol transits from "+x" to "+z" (FIG. 22D). At this time, the transition detector 25 sets the pre-emphasis control signal MUP to "1" (active), and sets the pre-emphasis control signal MDN to "0" (inactive), as illustrated in FIG. 5. Accordingly, as illustrated in FIG. 22D, the signal SIGA changes from the high-level voltage VH to the low-level voltage VL, the signal SIGB changes from the low-level voltage VL to the medium-level voltage VM through the medium-level voltage VMplus, and the signal SIGC changes from the medium-level voltage VM to the high-level voltage VH through the high-level voltage VHminus. At this time, the pre-emphasis controller 68B controls the driver unit 69B to set the voltage of the signal SIGB to the medium-level voltage VMplus that is slightly higher than the medium-level voltage VM in a first half time period (0.5 UI) of a time period in which the transmission device 10 outputs the symbol "+z". Likewise, the pre-emphasis controller 68C controls the driver unit 69B to set the voltage of the signal SIGC to the high-level voltage HMminus that is slightly lower than the high-level voltage VH in the first half time period (0.5 UI) of the time period in which the transmission device 10 outputs the symbol "+z". In other words, the transition of the difference AB corresponds to the transition W22, and has a possibility that the transition time of the difference AB becomes long; therefore, the pre-emphasis controllers 68B and 68C controls the driver units 69B and 69C to perform the pre-emphasis operation.

Moreover, in a case where the symbol DS is "+x" and the transition signals TxF9, TxR9, and TxP9 are "001", the symbol transits from "+x" to "−z" (FIG. 22E). At this time, the transition detector 25 sets both the pre-emphasis control signals MUP and MDN to "0" (inactive), as illustrated in FIG. 5. Accordingly, as illustrated in FIG. 22E, the signal SIGA maintains the high-level voltage VH, the signal SIGB changes from the low-level voltage VL to the medium-level voltage VM, and the signal SIGC changes from the medium-level voltage VM to the low-level voltage VL. In other words, in a case where the symbol transits from "+x" to "−z", none of the transitions of the differences AB, BC, and CA corresponds to the transitions W21 and W22, therefore, the pre-emphasis controllers 68A, 68B, and 68C control the driver units 69A, 69B, and 69C not to perform the pre-emphasis operation.

As described above, in the communication system 2, not only the driver unit that outputs the medium-level voltage VM after the transition, but also the driver unit that outputs the high-level voltage VH or low-level voltage VL performs the pre-emphasis operation. Accordingly, in the communication system 2, pre-emphasis works strongly, which makes it possible to enhance waveform quality, for example, in a case where the transmission path 100 is longer, as compared with the communication system 1.

FIG. 23 illustrates eye diagrams of the difference AB between the signal SIGA and the signal SIGB, the difference BC between the signal SIGB and the signal SIGC, and the difference CA between the signal SIGC and the signal SIGA. In the communication system 2 (FIG. 23) according to the present embodiment, pre-emphasis works strongly, which makes it possible to widen an eye opening more than a case of the communication system 1 according to the first embodiment (FIGS. 14B to 14C). As a result, it is possible to enhance communication performance in the communication system 2.

Moreover, in the communication system 2, in a case where one driver unit of the driver units 69A, 69B, and 69C outputs the medium-level voltage VMminus that is lower than the medium-level voltage VM, another driver unit outputs the low-level voltage VLplus that is higher than the low-level voltage VL, as illustrated in FIG. 22B. Further, in a case where one driver unit of the driver units 69A, 69B, and 69C outputs the medium-level voltage VMplus that is higher than medium-level voltage VM, another driver unit outputs the high-level voltage VHminus that is lower than the high-level voltage VH, as illustrated in FIG. 22D. This makes it possible to suppress variations in a common mode voltage that is an average voltage of the three signals SIGA, SIGB, and SIGC in the communication system 2. As a result, in the communication system 2, it is possible to reduce a possibility that electro-magnetic interference (EMI) occurs, which makes it possible to enhance communication performance.

As described above, in the present embodiment, not only the driver unit that outputs the medium-level voltage VM after the transition, but also the driver unit that outputs the high-level voltage VH or the low-level voltage VL performs the pre-emphasis operation, which makes it possible to enhance communication performance.

In the present embodiment, in a case where one driver unit outputs the medium-level voltage VMminus, another driver unit outputs the low-level voltage VLplus, and in a case where one driver unit outputs the medium-level voltage VMplus, another driver unit outputs the high-level voltage VHminus, which makes it possible to suppress variations in common mode voltage. As a result, it is possible to reduce the possibility that electro-magnetic interference occurs, which makes it possible to enhance communication performance.

<3. Application Examples>

Next, description is given of application examples of the communication systems described in the foregoing embodiments and modification examples.

Application Example 1

FIG. 24 illustrates an external appearance of a smartphone 300 (a multi-functional mobile phone) to which the communication system according to any of the foregoing embodiments, etc. is applied. Various devices are mounted in the smartphone 300. The communication system according to any of the foregoing embodiments, etc. is applied to a communication system that exchanges data between these devices.

FIG. 25 illustrates a configuration example of an application processor 310 used in the smartphone 300. The application processor 310 includes a CPU (Central Processing Unit) 311, a memory controller 312, a power source controller 313, an external interface 314, a GPU (Graphics Processing Unit) 315, a media processor 316, a display controller 317, and a MIPI (Mobile industry Processor interface) interface 318. In this example, the CPU 311, the memory controller 312, the power source controller 313, the external interface 314, the GPU 315, the media processor 316, and the display controller 317 are coupled to a system bus 319 to allow for mutual data exchange through the system bus 319.

The CPU 311 processes various pieces of information handled in the smartphone 300 in accordance with a program. The memory controller 312 controls the memory 501 used in a case where the CPU 311 performs information processing. The power source controller 313 controls a power source of the smartphone 300.

The external interface 314 is an interface for communication with external devices. In this example, the external interface 314 is coupled to a wireless communication unit 502 and an image sensor 410. The wireless communication unit 502 carries out wireless communication with mobile phone base stations. The wireless communication unit 502 includes, for example, a baseband unit, an RF (radio frequency) front end unit, etc. The image sensor 410 acquires an image, and includes, for example, a CMOS sensor.

The GPU 315 performs image processing. The media processor 316 processes information such as voice, characters, and graphics. The display controller 317 controls the display 504 through the MIPI interface 318. The MIPI interface 318 transmits an image signal to the display 504. As the image signal, it is possible to use, for example, a YUV-format signal, an RGB-format signal, etc. The MIPI interface 318 operates on the basis of a reference clock supplied from an oscillator circuit 330 including a crystal resonator. For example, the communication system according to any of the foregoing embodiments, etc. is applied to a communication system between the MIPI interface 318 and the display 504.

FIG. 26 illustrates a configuration example of the image sensor 410. The image sensor 410 includes a sensor 411, an ISP (Image Signal Processor) 412, a JPEG (Joint Photographic Experts Group) encoder 413, a CPU 414, a RAM (Random Access Memory) 415, a ROM (Read Only Memory) 416, a power source controller 417, an $I^2C$ (inter-integrated circuit) interface 418, and an MIPI interface 419. In this example, these respective blocks are coupled to a system bus 420 to allow for mutual data exchange through the system bus 420.

The sensor 411 acquires an image, and includes, for example, a CMOS sensor. The ISP 412 performs predetermined processing on the image acquired by the sensor 411. The JPEG encoder 413 encodes the image processed by the ISP 412 to generate a JPEG-format image. The CPU 414 controls respective blocks of the image sensor 410 in accordance with a program. The RAM 415 is a memory used in a case where the CPU 414 performs information processing. The ROM 416 stores a program to be executed in the CPU 414, a setting value obtained by calibration, etc. The power source controller 417 controls a power source of the image sensor 410. The $I^2C$ interface 418 receives a control signal from the application processor 310. Although not illustrated, the image sensor 410 also receives a clock signal from the application processor 310, in addition to the control signal. Specifically, the image sensor 410 is operable on the basis of clock signals of various frequencies. The MIPI interface 419 transmits an image signal to the application processor 310. As the image signal, it is possible to use, for example, a YUV-format signal, an RGB-format signal, etc. The MIPI interface 419 operates on the basis of a reference clock supplied from an oscillator circuit 430 including a crystal resonator, for example. For example, the communication system according to any of the foregoing embodiments, etc. is applied to a communication system between the MIPI interface 419 and the application processor 310.

Application Example 2

FIG. 27 illustrates a configuration example of a vehicle control system 600 to which the communication system according to any of the foregoing embodiments, etc. is applied. The vehicle control system 600 controls an operation of an automobile, an electric vehicle, a hybrid electric vehicle, a motorcycle, or the like. The vehicle control system 600 includes a driving system control unit 610, a body system control unit 620, a battery control unit 630, an outside-vehicle information detection unit 640, an in-vehicle information detection unit 650, and an integrated control unit 660. These units are coupled to one another through a communication network 690. The communication network 690 is allowed to use, for example, a network compliant with any of standards such as CAN (Controller Area Network), LIN (Local Interconnect Network), LAN (Local Area Network), and FlexRay (registered trademark). Each of the units includes, for example, a microcomputer, a storage section, a drive circuit that drives a device to be controlled, a communication I/F, and the like.

The driving system control unit 610 controls an operation of a device related to a driving system of a vehicle. The driving system control unit 610 is coupled to a vehicle state detector 611. The vehicle state detector 611 detects a state of the vehicle, and includes, for example, a gyro sensor, an acceleration sensor, sensors that detect an operation amount of an accelerator pedal, an operation amount of a brake pedal, a steering angle, etc, and the like. The driving system control unit 610 controls the operation of the device related to the driving system of the vehicle on the basis of information detected by the vehicle state detector 611. The communication system according to any of the foregoing embodiments, etc. is applied to a communication system between the driving system control unit 610 and the vehicle state detector 611.

The body system control unit 620 controls operations of various kinds of devices, such as a keyless entry system, a power window device, various kinds of lamps, mounted in the vehicle.

The battery control unit 630 controls a battery 631. The battery control unit 630 is coupled to the battery 631. The battery 631 supplies electric power to a driving motor, and includes, for example, a secondary battery, a cooling device, and the like. The battery control unit 630 obtains information such as a temperature, an output voltage, and an amount of remaining battery charge from the battery 631, and controls the cooling device, etc. of the battery 631 on the basis of the information. The communication system according to any of the foregoing embodiments, etc. is applied to a communication system between the battery control unit 630 and the battery 631.

The outside-vehicle information detection unit 640 detects outside-vehicle information. The outside-vehicle information detection unit 640 is coupled to an imaging section 641 and an outside-vehicle information detector 642. The imaging section 641 takes an image outside the vehicle, and includes, for example, a ToF (Time Of Flight) camera, a stereo camera, a monocular camera, an infrared camera, and the like. The outside-vehicle information detector 642 detects outside-vehicle information, and includes, for example, a sensor that detects atmospheric conditions or weather conditions, a sensor that detects another vehicle, an obstacle, a pedestrian, etc. around the vehicle, and the like. The outside-vehicle information detection unit 640 recognizes, for example, the atmospheric conditions, the weather conditions, road surface conditions, etc, on the basis of the image taken by the imaging section 641 and the information detected by the outside-vehicle information detector 642, and detects an object such as another vehicle, an obstacle, a pedestrian, and a sign around the vehicle, and a character on a road surface, or detects a distance between the object and the vehicle. The communication system according to any or the foregoing embodiments, etc. is applied to a communication system between the outside-vehicle information detection it 640 and each of the imaging section 641 and the outside-vehicle information detector 642.

The in-vehicle information detection unit 650 detects in-vehicle information. The in-vehicle information detection unit 650 is coupled to a driver state detector 651. The driver state detector 651 detects a state of a driver, and includes, for example, a camera, a biosensor, a microphone, and the like. The in-vehicle information detection unit 650 monitors a degree of fatigue of the driver, a degree of concentration of the driver, whether the driver is dozing, etc. on the basis of information detected by the driver state detector 651. The communication system according to any of the foregoing embodiments etc. is applied to a communication system between the in-vehicle information detection unit 650 and the driver state detector 651.

The integrated control unit 660 controls an operation of the vehicle control system 600. The integrated control unit 660 is coupled to an operation section 661, a display section 662, and an instrument panel 663. The operation section 661 is operated by an occupant, and includes, for example, a touch panel, various kinds of buttons and switches, and the like. The display section 662 displays an image, and is configured with use of, for example, a liquid crystal display panel. The instrument panel 663 displays a state of the vehicle, and includes meters such as a speed meter, various kinds of alarm lamps, and the like. The communication system according to any of the foregoing embodiments, etc. is applied to a communication system between the integrated control unit 660 and each of the operation section 661, the display section 662, and the instrument panel 663.

Although the present technology has been described above with reference to some embodiments, modification examples, and application examples to electronic apparatuses, the present technology is not limited thereto, and may be modified in a variety of ways.

For example, in the foregoing respective embodiments, in the case where the transition signals TxF9, TxR9, RxP9 are "000" or "010", the pre-emphasis operation is performed; however, the foregoing embodiments, etc. are not limited thereto, and the pre-emphasis operation may be performed in any other cases.

It is to be noted that the effects described in the present specification are illustrative and non-limiting, and other effects may be included.

It is to be noted that the present technology may have the following configurations.

(1)

A transmission device, including:

a driver unit that transmits a data signal with use of a first voltage state, a second voltage state, and a third voltage state interposed between the first voltage state and the second voltage state, and is configured to make a voltage in the third voltage state changeable; and a controller that changes the voltage in the third voltage state to cause the driver unit to perform emphasis.

(2)

The transmission device according to (1), in which the controller determines whether or not to cause the driver unit to perform emphasis in accordance with change among the first voltage state, the second voltage state, and the third voltage state.

(3)

The transmission device according to (2), in which
the data signal indicates a sequence of symbols, and
the controller determines whether or not to cause the driver unit to perform emphasis on the basis of a predetermined symbol transition in the sequence.

(4)

The transmission device according to (3), in which
the driver unit includes:

a first driver unit that selectively sets a voltage state at a first output terminal to one of the first voltage state, the second voltage state, and the third voltage state, a second driver unit that selectively sets a voltage state at a second output terminal to one of the first voltage state, the second voltage state, and the third voltage state, and a third driver unit that selectively sets a voltage state at a third output terminal to one of the first voltage state, the second voltage state, and the third voltage state, and the voltage states at the first output terminal, the second output terminal, and the third output terminal are different from one another.

(5)

The transmission device according to (4), further including a signal generator that generates a symbol signal on the basis of a transition signal indicating the transition of the symbol, in which the first driver unit, the second driver unit, and the third driver unit respectively set the voltage states at the first output terminal, the second output terminal, and the third output terminal on the basis of the symbol signal, and the controller detects the predetermined symbol transition on the basis of the transition signal to determine whether or not to cause the driver unit to perform emphasis.

(6)

The transmission device according to (5), in which the controller changes the voltage in the third voltage state upon a symbol transition that causes the voltage state at the first output terminal, the voltage state at the second output terminal, and the voltage state at the third output terminal to change together, thereby causing the emphasis to be performed.

(7)

The transmission device according to (6), in which the controller also changes the voltage in the first voltage state or the voltage in the second voltage sate upon the symbol transition that causes the voltage state at the first output terminal, the voltage state at the second output terminal, and the voltage state at the third output terminal to change together, thereby causing the emphasis to be performed.

(8)

The transmission device according to any one of (4) to (7), in which the first driver unit includes:

a first circuit provided in a path from a first power source to the first output terminal, and a second circuit provided in a path from a second power source to the first output terminal, and the first driver unit causes a current to pass from the first power source to the second power source through the first circuit and the second circuit, thereby setting the voltage state at the first output terminal to the third voltage state.

(9)

The transmission device according to (8), in which the controller changes an impedance ratio between an impedance in the first circuit and an impedance in the second circuit to change the voltage in the third voltage state.

(10)

The transmission device according to (9), in which the controller changes the impedance ratio to cause a parallel impedance of the impedance in the first circuit and the impedance in the second circuit to be constant.

(11)

The transmission device according to any one of (8) to (10), in which the first circuit includes a plurality of first sub-circuits each including a first resistor and a first transistor provided in the path from the first power source to the first output terminal, the second circuit includes a plurality of second sub-circuits each including a second resistor and a second transistor provided in the path from the second power source to the first output terminal, and the first transistor in one or more of the plurality of first sub-circuits is turned on and the second transistor in one or more of the plurality of second sub-circuits is turned on to set the voltage state at the first output terminal to the third voltage state.

(12)

The transmission device according to (11), in which the controller increases number of first transistors to be turned on of a plurality of first transistors in the first circuit and decreases number of second transistors to be turned on of a plurality of second transistors in the second circuit to change the voltage in the third voltage state.

(13)

The transmission device according to (11) or (12), in which the plurality of first sub-circuits are divided into a plurality of first groups, the plurality of second sub-circuits are divided into a plurality of second groups, and the controller turns on or off a plurality of first transistors in the first circuit in a unit of the first group and turns on or off a plurality of second transistors in the second circuit in a unit of the second group.

(14)

The transmission device according to (13), in which the plurality of first groups includes a first sub-group and a second sub-group, and the first sub-circuits belonging to the first sub-group are different in number from the second sub-circuits belonging to the second sub-group.

(15)

The transmission device according to (4), in which the first driver unit includes:

a first circuit provided in a path from a first power source to the first output terminal, a second circuit provided in a path from a second power source to the first output terminal, and a third circuit that includes a voltage generator and a switch, and turns the switch on to supply the voltage in the third voltage state to the first output terminal, the voltage generator generating the voltage in the third voltage state.

(16)

A transmission method, including:

transmitting a data signal with use of a first voltage state, a second voltage state, and a third voltage state interposed between the first voltage state and the second voltage state, and changing a voltage in the third voltage state to perform emphasis.

(17)

A communication system provided with a transmission device and a reception device, the transmission device including:

a driver unit that transmits a data signal with use of a first voltage state, a second voltage state, and a third voltage state interposed between the first voltage state and the second voltage state, and is configured to make a voltage in the third voltage state changeable; and a controller that changes the voltage in the third voltage state to cause the driver unit to perform emphasis.

This application claims the benefit of Japanese Priority Patent Application No. 2016-017962 filed with the Japan Patent Office on Feb. 2, 2016, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A transmission device, comprising:
   a driver unit that transmits a data signal with use of a first voltage state, a second voltage state, and a third voltage state interposed between the first voltage state and the second voltage state, and is configured to make a voltage in the third voltage state changeable; and
   a controller that changes the voltage in the third voltage state to cause the driver unit to perform emphasis, wherein
   the controller determines whether or not to cause the driver unit to perform emphasis in accordance with change among the first voltage state, the second voltage state, and the third voltage state,
   the data signal indicates a sequence of symbols,
   the controller changes the voltage in the third voltage state on a basis of a transition of the symbols in the sequence,
   the driver unit includes:
      a first driver unit that selectively sets a voltage state at a first output terminal to one of the first voltage state, the second voltage state, and the third voltage state,
      a second driver unit that selectively sets a voltage state at a second output terminal to one of the first voltage state, the second voltage state, and the third voltage state, and
      a third driver unit that selectively sets a voltage state at a third output terminal to one of the first voltage state, the second voltage state, and the third voltage state, and
   the voltage states the first output terminal, the second output terminal, and the third output terminal are different from one another.

2. The transmission device according to claim 1, further comprising a signal generator that generates a symbol signal on a basis of a transition signal indicating the transition of the symbol, wherein
   the first driver unit, the second driver unit, and the third driver unit respectively set the voltage states at the first output terminal, the second output terminal, and the third output terminal on a basis of the symbol signal, and
   the controller detects the transition of the symbol on a basis of the transition signal to change the voltage in the third voltage state.

3. The transmission device according to claim 2, wherein the controller changes the voltage in the third voltage state upon a symbol transition that causes the voltage state at the first output terminal, the voltage state at the second output terminal, and the voltage state at the third output terminal to change together, thereby causing the emphasis to be performed.

4. The transmission device according to claim 3, wherein the controller also changes the voltage in the first voltage state or the voltage in the second voltage sate upon the symbol transition that causes the voltage state at the first output terminal, the voltage state at the second output terminal, and the voltage state at the third output terminal to change together, thereby causing the emphasis to be performed.

5. The transmission device according to claim 1, wherein the first driver unit includes:
   a first circuit provided in a path from a first power source to the first output terminal, and
   a second circuit provided in a path from a second power source to the first output terminal, and
   the first driver unit causes a current to pass from the first power source to the second power source through the first circuit and the second circuit, thereby setting the voltage state at the first output terminal to the third voltage state.

6. The transmission device according to claim 5, wherein the controller changes an impedance ratio between an impedance in the first circuit and an impedance in the second circuit to change the voltage in the third voltage state.

7. The transmission device according to claim 6, wherein the controller changes the impedance ratio to cause a parallel impedance of the impedance in the first circuit and the impedance in the second circuit to be constant.

8. The transmission device according to claim 5, wherein
   the first circuit includes a plurality of first sub-circuits each including a first resistor and a first transistor provided in the path from the first power source to the first output terminal,
   the second circuit includes a plurality of second sub-circuits each including a second resistor and a second transistor provided in the path from the second power source to the first output terminal, and
   the first transistor in one or more of the plurality of first sub-circuits is turned on and the second transistor in one or more of the plurality of second sub-circuits is turned on to set the voltage state at the first output terminal to the third voltage state.

9. The transmission device according to claim 8, wherein the controller increases number of first transistors to be turned on of a plurality of first transistors in the first circuit and decreases number of second transistors to be turned on of a plurality of second transistors in the second circuit to change the voltage in the third voltage state.

10. The transmission device according to claim 8, wherein
    the plurality of first sub-circuits are divided into a plurality of first groups,
    the plurality of second sub-circuits are divided into a plurality of second groups, and
    the controller turns on or off a plurality of first transistors in the first circuit in a unit of the first group and turns on or off a plurality of second transistors in the second circuit in a unit of the second group.

11. The transmission device according to claim 10, wherein
    the plurality of first groups includes a first sub-group and a second sub-group, and
    the first sub-circuits belonging to the first sub-group are different in number from the second sub-circuits belonging to the second sub-group.

12. The transmission device according to claim 1, wherein the first driver unit includes:
    a first circuit provided in a path from a first power source to the first output terminal,
    a second circuit provided in a path from a second power source to the first output terminal, and
    a third circuit that includes a voltage generator and a switch, and turns the switch on to supply the voltage in the third voltage state to the first output terminal, the voltage generator generating the voltage in the third voltage state.

13. The transmission device according to claim 1, wherein the controller selectively changes a voltage in the first voltage state or the second voltage state in addition to the third voltage state to cause the driver unit to perform emphasis.

14. The transmission device according to claim 1, wherein the controller changes the voltage in the third voltage state while controlling an output impedance of the driver unit to be constant.

15. A transmission device, comprising:
a driver unit that transmits a data signal with use of a first voltage state, a second voltage state, and a third voltage state interposed between the first voltage state and the second voltage state, and is configured to make a voltage in the third voltage state changeable; and
a controller that changes the voltage in the third voltage state to cause the driver unit to perform emphasis, wherein
the driver unit includes:
  a first driver unit that selectively sets a voltage state at a first output terminal to one of the first voltage state, the second voltage state, and the third voltage state,
  a second driver unit that selectively sets a voltage state at a second output terminal to one of the first voltage state, the second voltage state, and the third voltage state, and
  a third driver unit that selectively sets a voltage state at a third output terminal to one of the first voltage state, the second voltage state, and the third voltage state,
the voltage states at the first output terminal, the second output terminal, and the third output terminal are different from one another,
the controller changes a voltage in the first voltage state while controlling an output impedance of the first driver unit to be constant,
the controller changes a voltage in the second voltage state while controlling an output impedance of the second driver unit to be constant, and
the controller changes the voltage in the third voltage state while controlling an output impedance of the third driver unit to be constant.

16. A communication system provided with a transmission device and a reception device, the transmission device comprising:
a driver unit that transmits a data signal with use of a first voltage state, a second voltage state, and a third voltage state interposed between the first voltage state and the second voltage state, and is configured to make a voltage in the third voltage state changeable; and
a controller that changes the voltage in the third voltage state to cause the driver unit to perform emphasis, wherein
the controller determines whether or not to cause the driver unit to perform emphasis in accordance with change among the first voltage state, the second voltage state, and the third voltage state,
the data signal indicates a sequence of symbols,
the controller changes the voltage in the third voltage state on a basis of a transition of the symbols in the sequence,
the driver unit includes:
  a first driver unit that selectively sets a voltage state at a first output terminal to one of the first voltage state, the second voltage state, and the third voltage state,
  a second driver unit that selectively sets a voltage state at a second output terminal to one of the first voltage state, the second voltage state, and the third voltage state, and
  a third driver unit that selectively sets a voltage state at a third output terminal to one of the first voltage state, the second voltage state, and the third voltage state, and
the voltage states the first output terminal, the second output terminal, and the third output terminal are different from one another.

* * * * *